(12) United States Patent
Chung et al.

(10) Patent No.: US 12,474,917 B2
(45) Date of Patent: Nov. 18, 2025

(54) HARDWARE SECURITY MODULE FIRMWARE UPDATE

(71) Applicant: TEXAS INSTRUMENTS INCORPORATED, Dallas, TX (US)

(72) Inventors: Peter Chung, Frisco, TX (US); Bhargavi Nisarga, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 103 days.

(21) Appl. No.: 18/448,432

(22) Filed: Aug. 11, 2023

(65) Prior Publication Data

US 2025/0053407 A1 Feb. 13, 2025

(51) Int. Cl.
*G06F 9/44* (2018.01)
*G06F 8/65* (2018.01)
*H04L 9/08* (2006.01)
*H04L 9/30* (2006.01)
*H04L 9/32* (2006.01)

(52) U.S. Cl.
CPC ............... *G06F 8/65* (2013.01); *H04L 9/088* (2013.01); *H04L 9/30* (2013.01); *H04L 9/3247* (2013.01)

(58) Field of Classification Search
CPC ...................................................... G06F 8/65
USPC ........................................................ 717/168
See application file for complete search history.

(56) References Cited

U.S. PATENT DOCUMENTS

| | | | |
|---|---|---|---|
| 11,303,440 B2 | 4/2022 | Aschauer et al. | |
| 11,714,633 B2 * | 8/2023 | Fassino | H04L 9/0891 |
| | | | 713/158 |
| 12,333,014 B2 * | 6/2025 | Hong | G06F 21/64 |
| 2014/0068594 A1 | 3/2014 | Young et al. | |
| 2022/0179640 A1 | 6/2022 | Fassino et al. | |
| 2023/0229775 A1 * | 7/2023 | Wang | G06F 8/65 |
| | | | 713/176 |

OTHER PUBLICATIONS

EBUN-AMU: "What is a Firmware Update and Why Does Your Device Need One?"; found on the internet May 19, 2023 @ https://www.makeuseof.com/firmware-update/.
Davies, et al.: hardware security module (HSM); found on the internet May 19, 2023 @ https://www.techtarget.com/searchsecurity/definition/hardware-security-module-HSM.

* cited by examiner

*Primary Examiner* — Evral E Bodden
(74) *Attorney, Agent, or Firm* — Xianghui Huang; Frank D. Cimino

(57) ABSTRACT

A non-transitory machine-readable medium having machine-readable instructions including a firmware generator, the machine-readable instructions for the firmware generator being executable by a processor core to perform operations including signing a firmware image for a hardware security module (HSM) with a private key of a public private key pair to provide a first signature and augmenting the firmware image with a header that includes the first signature to provide an augmented firmware image. The operations further include encrypting the augmented firmware image with a symmetric key to provide an encrypted augmented firmware image. Furthermore, the operations include signing the encrypted augmented firmware image with the private key to provide a second signature and augmenting the encrypted augmented firmware image with the second signature to provide a firmware package for the HSM.

20 Claims, 14 Drawing Sheets

HARDWARE SECURITY MODULE FIRMWARE UPDATE

TECHNICAL FIELD

This disclosure relates to Hardware Security Modules (HSMs), in particular, this description relates to a system and method for updating firmware in HSMs.

BACKGROUND

A hardware security module (HSM) is a physical device that provides extra security for sensitive data. An HSM is a hardware crypto accelerator module that includes its own core (CPU), crypto accelerator and memory. HSMs are used to provision cryptographic keys for functions such as encryption, decryption and authentication for the use of applications, identities and databases. HSMs can be embedded in other hardware, including smart cards, appliances and other external devices. Securing the keys in a cryptographic system facilitates maintenance of a secure system. The HSM protects cryptographic keys and handles the encryption and decryption processes. HSMs also can create and verify digital signatures.

Firmware is software that is embedded in a piece of hardware. Firmware is made up of programs written by software developers to make hardware devices function. A firmware update is similar to a software update. Manufacturers of devices create updated and better firmware. Updates add or rewrite the existing software on the device to support improve efficiency. A firmware update can also tune the performance of firmware or device drivers, potentially enhancing the performance of the processor or other device hardware. HSM firmware updates enable fixing security bugs which otherwise can compromise the security of the device or the system the device is used in.

SUMMARY

A first example relates to a non-transitory machine-readable medium having machine-readable instructions comprising a firmware generator, the machine-readable instructions for the firmware generator being executable by a processor core to perform one or more operations. The one or more operations include signing a firmware image for a hardware security module (HSM) with a private key of a public private key pair to provide a first signature and augmenting the firmware image with a header that includes the first signature to provide an augmented firmware image. The one or more operations further include encrypting the augmented firmware image with a symmetric key to provide an encrypted augmented firmware image. Furthermore, the one or more operations include signing the encrypted augmented firmware image with the private key to provide a second signature; and augmenting the encrypted augmented firmware image with the second signature to provide a firmware package for the HSM.

A second example relates to a non-transitory machine-readable medium having machine-readable instructions including a firmware verifier, the machine-readable instructions for the firmware verifier being executable by a processor core to perform one or more operations. The one or more operations include receiving a firmware package for a hardware security module (HSM) and requesting verification of a first signature of the firmware package by the HSM, wherein the HSM uses a public key of a public-private key pair to verify an integrity of the firmware package. The one or more operations further include extracting an encrypted augmented firmware image from the firmware package responsive to an indication from the HSM that the first signature is verified and requesting decryption of the encrypted augmented firmware image by the HSM, wherein the HSM uses a symmetric key to provide a decrypted augmented firmware image in response to the request for decryption. Furthermore, the one or more operations include transferring the decrypted augmented firmware image to the HSM, wherein the decrypted augmented firmware image includes a second signature that is verifiable with the public key.

A third example relates to a system including a hardware security module (HSM) storing updatable firmware; and a non-transitory memory having machine-readable instructions. The system further includes a processor core that accesses the non-transitory memory and executes the machine-readable instructions, the machine-readable instructions including a firmware verifier being executable by the processor core to perform one or more operations. The one or more operations include receiving a firmware package for the HSM and requesting verification of a first signature of the firmware package by the HSM, wherein the HSM uses a public key of a public-private key pair to verify an integrity of the firmware package and extracting an encrypted augmented firmware image from the firmware package responsive to an indication from the HSM that the first signature is verified. The one or more operations further include requesting decryption of the encrypted augmented firmware image by the HSM, wherein the HSM uses a symmetric key to provide a decrypted augmented firmware image in response to the request for decryption; and transferring the decrypted augmented firmware image to the HSM. The HSM includes a firmware updater being executable by the HSM to perform operations, the operations for the firmware updater including writing the decrypted augmented firmware image to an HSM firmware region of the HSM, and verifying a second signature in the decrypted augmented firmware image to verify an integrity of a firmware image of the decrypted augmented firmware image using the public key.

DETAILED DESCRIPTION

Figure 1:
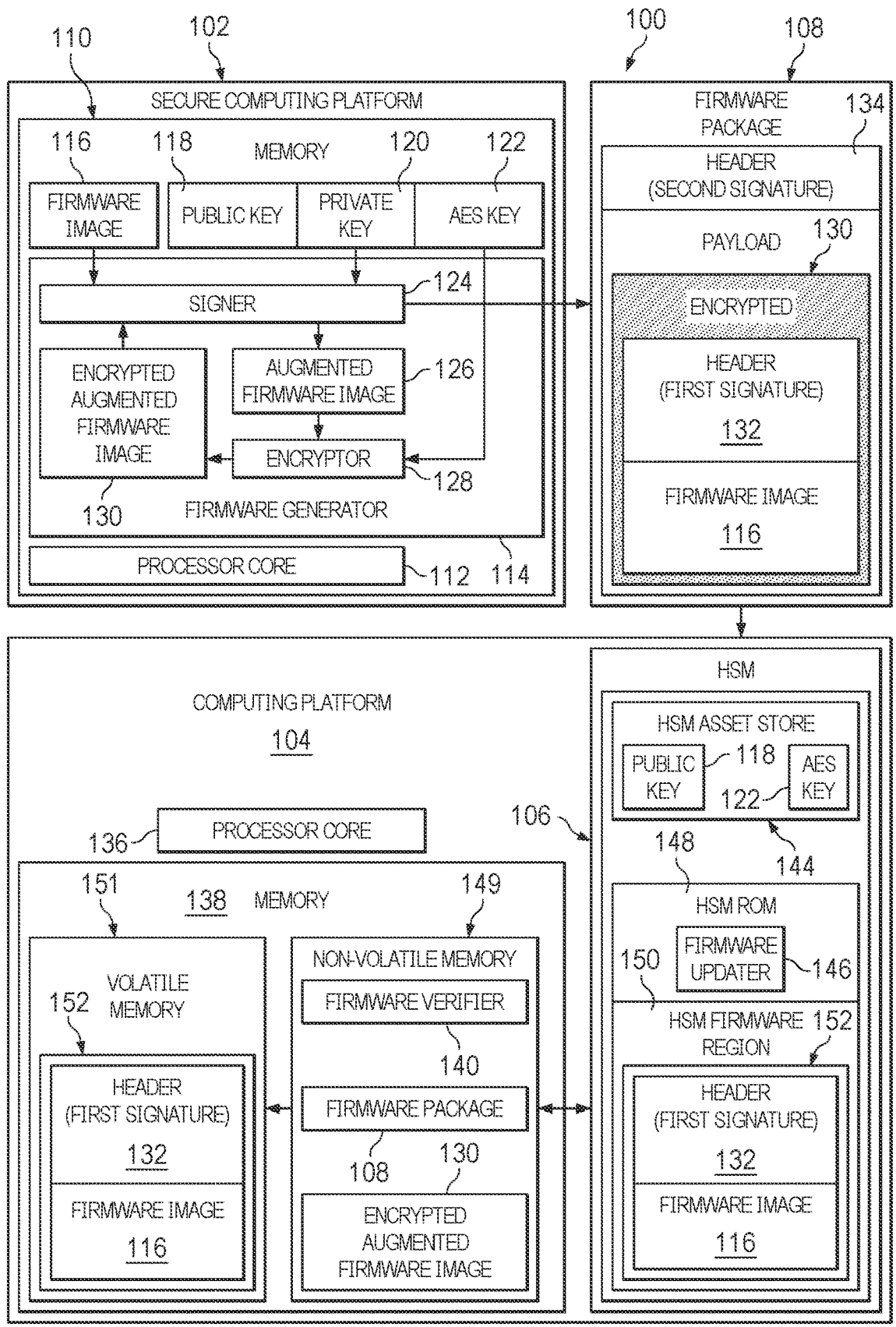
FIG. 1 illustrates an example computing system.

This description relates to updating firmware for hardware security modules (HSMs). Updates to the firmware of the HSM are employable to tune the performance of the HSM. The HSM described herein has an HSM read only memory (ROM) and an HSM firmware region. The HSM firmware region stores the firmware which can be updated. In some examples, the HSM firmware region is read/write protected and is only accessible by the HSM ROM and a corresponding system ROM. In some examples, the firmware of the HSM needs to be updated after the HSM is delivered/provided to the field (or the customer end). When it comes to firmware update for HSM, which plays roles in the security of a system, confidentiality and integrity of the HSM firmware update (e.g., the updated version of the firmware) needs to be verified before the firmware of the HSM is updated. Also, roll-back protection (e.g., preventing the execution of incorrect firmware version) needs to be supported.

In view of the foregoing, a system and a method for updating the firmware of the HSM that verifies the confidentiality and integrity of the HSM firmware update before updating the firmware of the HSM is described herein. Further, the system and the method described herein supports roll-back protection. The proposed system for updating the firmware of the HSM includes a secured computing platform (e.g., at the vendor's end) that generates a firmware package that includes a firmware image (e.g., the updated version of the firmware) that is signed and encrypted which is to be utilized to update the firmware (e.g., the already existing firmware) of the HSM. In particular, to ensure the confidentiality of the firmware image, the firmware image is encrypted using a symmetric key (e.g., vendor's symmetric key). Further, in order to ensure the integrity of the firmware image, the firmware image is signed with a private key (e.g., a vendor's private key) of a public private key pair twice, once before the encryption of the firmware image and once after the encryption of the firmware image. In some examples, the firmware image is further signed by an additional private key, for example, the customer's private key that is associated with another public private key pair. Upon generating the firmware package, the firmware package is distributed in the field (e.g., to the customer end) to be utilized to update the firmware of the HSM at the customer's end.

The system further includes a computing platform at the receiving end (e.g., the customer's end) which receives the firmware package and downloads the firmware. Upon downloading the firmware package, a system read only memory (ROM) associated with the computing platform and the HSM ROM are configured to authenticate the firmware package/image and decrypt the firmware image, prior to updating the firmware of the HSM using the firmware image. The system ROM and the HSM ROM are configured to decrypt the firmware image using the symmetric key that was used to encrypt the firmware image at the vendor's end. Further, in order to authenticate the integrity of the firmware image, the system ROM and the HSM ROM are configured to verify signature(s) of the firmware package/image before decryption of the firmware image, using the public key(s) of the corresponding public private key pair(s). Further, the HSM ROM is configured to verify signature(s) of the firmware image after the decryption of the firmware image.

In addition, the system ROM and the HSM ROM are further configured to verify the version of the firmware image before the HSM firmware update is executed. In some examples, only an authorized root of trust (e.g., the system ROM) is allowed to perform the HSM firmware update. In particular, a bus ID is added to a command/request to initiate the transferring the firmware image to the HSM, and the HSM accepts the command/request only when the bus identifier (ID) matches a read only memory (ROM) ID of the system ROM. By verifying the signatures before and after decryption, the system supports strong security features. Further, by utilizing the system ROM and the HSM ROM, the system enables updating the firmware of the HSM without the need for pre-programmed software in the device. Furthermore, the system supports roll-back protection. In addition, signing the firmware image before and after encryption allows decrypting the firmware image before moving/copying the firmware image to the HSM, thereby saving the need to reserve additional memory in the HSM to store the encrypted firmware image.

FIG. 1 illustrates an example computing system 100. The computing system 100 includes a secure computing platform 102 and a computing platform 104 including a hardware security module (HSM) 106. The secure computing platform 102 is configured to provide/generate a firmware package 108 to be utilized to update a firmware associated with the HSM 106 of the computing platform 104. The secure computing platform 102 includes a memory 110 and a processor core 112. The memory 110 is implemented as a non-transitory machine-readable medium, such as a hard disk drive, flash memory, a solid-state drive, random access memory (RAM), or a combination thereof. The memory 110 is configured to store a firmware image 116 that is utilized to generate the firmware package 108. Further, the memory 110 is configured to store one or more keys to be utilized to generate the firmware package 108. In particular, the memory 110 is configured to store a public key 118 and a private key 120 associated with a public private key pair and an advanced encryption standard (AES) key 122. In some examples, the AES key 122 is a symmetric key.

The memory 110 further includes a firmware generator 114 including machine-readable instructions which when executed by the processor core 112 cause the firmware generator 114 to perform the one or more operations to generate the firmware package 108. The firmware generator 114 includes a signer 124 configured to sign the firmware image 116 with the private key 120 of the public private key pair to provide a first signature. The signer 124 is further configured to augment the firmware image 116 with a header 132 (as illustrated within the firmware package 108 in FIG. 1) that includes the first signature to provide an augmented firmware image 126. The firmware image 116 and the header 132 illustrated within the firmware package 108 in FIG. 1 together forms the augmented firmware image 126. In some examples, the header 132 includes information related to image metadata including one or more of the signatures of the firmware image 116 (e.g., the first signature), the public key 118, the header type/version, the image type of the firmware image 116, image size of the firmware image 116, rollback version (e.g., the version of the firmware image 116) etc. The firmware generator 114 further includes an encryptor 128 configured to encrypt the augmented firmware image 126 with the symmetric key 122 (or the AES key 122) to provide an encrypted augmented firmware image 130 (as also illustrated within the firmware package 108 in FIG. 1). The machine-readable instructions for the firmware generator 114 are construed herein to include machine-readable instructions for the signer 124 and the encryptor 128.

Furthermore, the signer 124 is configured to sign the encrypted augmented firmware image 130 with the private key 120 to provide a second signature. In addition, the signer 124 is configured to augment the encrypted augmented firmware image 130 with the second signature to provide the firmware package 108. In some examples, the second signature is included in a header 134 (as illustrated within the firmware package 108 in FIG. 1) augmented to the encrypted augmented firmware image 130. In some examples, the header 134 includes information related to image metadata including one or more of the signatures of the firmware image 116 (e.g., the second signature), the public key 118, the header type/version, the image type of the firmware image 116, image size of the firmware image 116, rollback version (i.e., the version of the firmware image 116) etc. Although not shown here, in some examples, the firmware generator 114 may further be configured to sign the firmware package 108 with another private key (e.g., a customer private key) of another public private key pair (e.g., a customer public private key pair) to provide a third signature. In such instances, the firmware generator 114 is further configured to augment the firmware package 108 with the third signature to provide a signed firmware package (not shown here). Further, in such instances, the memory 110 may be configured to store the other private key and the public key associated with the other public private key pair (e.g., the customer public private key pair). In some examples, the firmware package 108 may be signed with the other private key (e.g., the customer private key) outside of the secure computing platform 102, for example, at a third party computing platform.

In response to generating the firmware package 108, the firmware package 108 is provided to the computing platform 104 to be utilized to update the firmware associated with the HSM 106. The computing platform 104 includes a processor core 136, a memory 138 (e.g., a non-transitory memory or a non-transitory machine-readable medium) and the HSM 106. The HSM 106 includes an HSM ROM 148 and an HSM firmware region 150. The firmware (e.g., an updatable firmware) associated with the HSM 106 is stored in the HSM firmware region 150. The memory 138 includes a non-volatile memory 149 and a volatile memory 151 (e.g., a random-access memory (RAM)). The non-volatile memory 149 includes system ROM, flash memory, hard drives etc. The memory 138 further includes a firmware verifier 140 including machine-readable instructions executable by the processor core 136 to perform one or more operations to update the firmware associated with the HSM 106. In some examples, the firmware verifier 140 is included within the system ROM of the memory 138.

In some examples, the public key 118 and the symmetric key 122 are stored in a factory configuration (FCFG) region (which is pre-programmed by a vendor root of trust (ROT)) associated with the memory 138. The FCFG region is a special non-volatile memory region that is dedicated for factory configurations. The FCFG region is only accessible by the system ROM of the memory 138. The firmware verifier 140 is further configured to copy the public key 118 and the symmetric key 122 from the FCFG region to an HSM asset store 144 which is stored in a secure memory of the HSM 106. The public key 118 and the symmetric key 122 are copied to the HSM asset store 144 to enable the HSM 106 to access the public key 118 and the symmetric key 122. The HSM asset store 144 is only accessible by the system ROM and the HSM ROM 148. No other applications can read keys (e.g., the public key 118 and the symmetric key 122) stored in the HSM asset store 144 (or the FCFG region) and therefore, the keys stored in the HSM asset store 144 are securely protected. In the examples where the firmware generator 114 is configured to sign the firmware package 108 with the other private key (e.g., a customer private key) of the other public private key pair, the HSM 106 is further configured to store the associated public key (e.g., the customer public key). In some examples, the associated public key of the other public private key pair is stored in a system configuration (SCFG) region (which is pre-programmed by the customers)) of the memory 138. The firmware verifier 140 is further configured to copy the other private key from the SCFG region to the HSM asset store 144.

In response to receiving the firmware package 108 at the computing platform 104, the firmware verifier 140 is configured to verify and handle the firmware package 108. Verifying and handling the firmware package 108 includes downloading the firmware package 108 into the memory 138 associated with the computing platform 104. In some examples, the firmware package 108 may be downloaded to the flash memory (e.g., the non-volatile memory) associated with the memory 138. Alternately, in other examples, the firmware package 108 may be downloaded to the volatile memory 151 (e.g., the RAM). Responsive to downloading the firmware package 108 to the volatile/non-volatile memory, an HSM flag of the firmware verifier 140 is set that provides an indication to the system ROM associated with the memory 138 that an HSM firmware update is available. Further, a pointer of the firmware verifier 140 is set that provides an indication to the system ROM about the location where the firmware package 108 is downloaded. Subsequently, the computing platform 104 is reset.

The system ROM (in particular, the firmware verifier 140) is subsequently configured to detect the firmware package 108 based on checking the HSM flag and the pointer. If the firmware package 108 is in the flash memory (e.g., the non-volatile memory), in some examples, the system ROM is configured to copy the firmware package to the volatile memory 151 (e.g., the RAM). Alternately, in other examples, the firmware package 108 is not copied to the volatile memory 151 and is kept in the flash memory itself. Subsequently, the firmware verifier 140 is configured to request verification of the second signature of the firmware package 108 by the HSM 106. The HSM 106 includes a firmware updater 146 that includes machine-readable instructions that when executed by the HSM 106 (or a processor core associated therewith) perform one or more operations to be utilized to update the firmware associated with the HSM 106. In particular, the HSM updater 146 is configured to receive the request for verification of the second signature. Upon receiving the request for verification of the second signature, the firmware updater 146 is configured to verify the second signature of the firmware package 108 by using the public key 118 stored in the HSM asset store 144. By verifying the second signature, the firmware updater 146 verifies the integrity and authenticity of the firmware package 108. Once the second signature is verified, the firmware updater 146 is configured to provide a verification indication to the firmware verifier 140 (in particular, the system ROM) indicating whether the verification of the second signature has passed or failed.

In the examples where the firmware generator 114 is configured to sign the firmware package 108 with the other private key (e.g., a customer private key) of the other public private key pair (as explained above), the firmware verifier 140 (in particular, the system ROM) may be configured to request verification of the third signature of the firmware package 108 by the HSM 106, prior to requesting the verification of the second signature by the HSM 106. In such examples, the firmware updater 146 is configured to verify the third signature by using the other public key (e.g., the customer public key) stored in the HSM asset store 144 in response to receiving the request to verify the third signature. Further, the firmware updater 146 is configured to provide a verification indication to the firmware verifier 140 (in particular, the system ROM) indicating whether the verification of the third signature has passed or failed.

In some instances, the firmware verifier 140 is configured to request the verification of the second signature, only if the third signature is verified (in particular, the verification of the third signature has passed) by the firmware updater 146. By verifying the third signature, the firmware updater 146 verifies the integrity of the firmware package 108. If the firmware package 108 that is signed with the other private key is in the flash memory (e.g., the non-volatile memory), in some examples, the system ROM (in particular, the firmware verifier 140) may be configured to copy the firmware package 108 with the third signature to the volatile memory 151 (e.g., the RAM), prior to requesting the verification of the third signature. Alternately, in other examples, the firmware package 108 with the third signature is not copied to the volatile memory 151 and is kept in the flash memory itself, prior to requesting the verification of the third signature. The request for verification of the second signature and the third signature from the firmware verifier 140 (in particular, the system ROM) may include details of the location of the firmware package 108 within the firmware verifier 140, to enable the firmware updater 146 to verify the second signature and the third signature.

Responsive to receiving the indication that verification of the second signature has passed, the firmware verifier 140 is configured to extract the encrypted augmented firmware image 130 from the firmware package 108. The encrypted augmented firmware image 130 may be stored in the flash memory (e.g., the non-volatile memory) or the volatile memory 151 of the firmware verifier 140. Responsive to extracting the encrypted augmented firmware image 130, the firmware verifier 140 is configured to request decryption of the encrypted augmented firmware image 130 by the HSM 106. The firmware updater 146 is configured to receive the request to decrypt the encrypted augmented firmware image 130. Responsive to receiving the request to decrypt the encrypted augmented firmware image 130, the firmware updater 146 is configured to decrypt the encrypted augmented firmware image 130 using the symmetric key (e.g., AES key) 122 stored in the HSM asset store 144 to provide a decrypted augmented firmware image 152. In some examples, the decrypted augmented firmware image 152 is same as the augmented firmware image 126. In some examples, the decrypted augmented firmware image 152 is stored in the volatile memory 151 of the firmware verifier 140. In some examples, if the encrypted augmented firmware image 130 is stored in the flash memory (e.g., the non-volatile memory) of the firmware verifier 140, the firmware verifier 140 (in particular, the system ROM) is optionally configured to copy the encrypted augmented firmware image 130 to the volatile memory 151 prior to requesting the decryption of the encrypted augmented firmware image 130.

Responsive to the decrypted augmented firmware image 152 being stored in the volatile memory 151, the firmware verifier 140 (in particular, the system ROM) is configured to transfer the decrypted augmented firmware image 152 to the HSM 106, in particular, to the HSM firmware region 150. Alternately, in other examples, the firmware verifier 140 (in particular, the system ROM) is configured to transfer the decrypted augmented firmware image 152 to the HSM firmware region 150 of the HSM 106 as blocks of decrypted data, without storing the full decrypted augmented firmware image 152 in the volatile memory 151. In such examples, the blocks of the decrypted augmented firmware image 152 may be stored in the volatile memory 151. Further, in some examples, responsive to the firmware updater 146 decrypting the encrypted augmented firmware image 130 to form the decrypted augmented firmware image 152, the firmware verifier 140 is configured to transfer the decrypted augmented firmware image 152 to the HSM firmware region 150 without storing the full decrypted augmented firmware image 152 or the blocks of the decrypted augmented firmware image 152 in the volatile memory 151. In the examples where the decrypted augmented firmware image 152 is stored in the volatile memory 151, the firmware verifier 140 is optionally configured to request verification of the first signature of the decrypted augmented firmware image 152 by the HSM 106, prior to transferring the decrypted augmented firmware image 152 to the HSM 106. Responsive to receiving the request for verification of the first signature, the HSM 106, in particular, the firmware updater 146 is configured to verify the first signature of the decrypted augmented firmware image 152 using the public key stored in the HSM asset store 144. Once the first signature of the decrypted augmented firmware image 152 is verified, the firmware updater 146 is further configured to provide a verification indication to the firmware verifier 140 indicating whether the verification of the first signature has passed or failed.

In such examples, the firmware verifier 140 (in particular, the system ROM) is configured to transfer the decrypted augmented firmware image 152 to the HSM firmware region 150 responsive to receiving the verification indication indicating that the verification of the first signature has passed. In some examples, responsive to transferring the decrypted augmented firmware image 152 to the HSM firmware region 150, the firmware verifier 140 is further configured to write the decrypted augmented firmware image 152 to a flash memory associated with the HSM firmware region 150. In examples where the HSM firmware region 150 already has a firmware stored in the HSM 106 (in particular, in the HSM firmware region 150), the firmware verifier 140 is configured to overwrite/replace the firmware that was previously stored in the HSM firmware region 150 (e.g., in the flash memory associated therewith) with the decrypted augmented firmware image 152. Alternately in other examples, responsive to transferring the decrypted augmented firmware image 152 to the HSM firmware region 150, the firmware updater 146 is configured to write the decrypted augmented firmware image 152 to a flash memory associated with the HSM firmware region 150. In examples where the HSM firmware region already has a firmware stored in the HSM 106 (in particular, in the HSM firmware region 150), the firmware updater 146 is configured to overwrite/replace the firmware that was previously stored in the HSM firmware region 150 (e.g., in the flash memory associated therewith) with the decrypted augmented firmware image 152.

Responsive to writing the complete decrypted augmented firmware image 152 to the flash memory associated with the HSM firmware region 150, the firmware updater 146 is configured to verify the first signature in the decrypted augmented firmware image 152 using the public key stored in the HSM asset store 144 to verify an integrity and authenticity of the firmware image 116 of the decrypted augmented firmware image 152.

In some examples, the firmware updater 146 is configured to confirm that a bus identifier (ID) of the transferring matches a read only memory (ROM) firmware ID of the HSM 106, and the transferring of the firmware image 116 and the verifying of the first signature is responsive to the confirming. In some examples, the bus ID is embedded in a system bus associated with the computing platform 104 and the firmware updater 146 is configured to verify the bus ID that is embedded in the system bus. Alternately, in other examples, the firmware verifier 140 may be configured to add the bus identifier (ID) to a command to initiate the transferring, wherein the bus ID matches the read only memory (ROM) firmware ID in the HSM 106.

In some examples, the firmware verifier 140 is configured to verify/read a version of the firmware stored in the HSM 106 (in particular, in the HSM firmware region 150) prior to transferring the decrypted augmented firmware image 152 to the HSM 106 (in particular, in the HSM firmware region 150) to provide HSM firmware rollback protection. Further, the firmware verifier 140 is configured to transfer the decrypted augmented firmware image 152 to the HSM 106 (in particular, to the HSM firmware region 150) responsive to a determination that a version of the firmware image 116 in the decrypted augmented firmware image 152 is later than or equal to the version of the firmware stored in the HSM 106 (in particular, in the HSM firmware region 150). Further, in some examples, the firmware verifier 140 (in particular, the system ROM) is configured to verify/read the version of the firmware stored in the HSM 106 (in particular, in the HSM firmware region 150) prior to requesting the verification of the second signature/the third signature of the firmware package 108. In such examples, the firmware verifier 140 is configured to request the verification of the second signature/the third signature responsive to the determination that the version of the firmware image 116 in the decrypted augmented firmware image 152 is later than or equal to the version of the firmware stored in the HSM 106 (in particular, in the HSM firmware region 150).

Responsive to passing of the verification of the first signature, the firmware updater 146 is configured to provide an indication to the firmware verifier 140 that the HSM firmware update is complete. The HSM firmware update is complete only after the decrypted augmented firmware image 152 is written to the HSM firmware region 150 and after the firmware updater 146 has verified the first signature. Upon receiving the indication that the HSM firmware update is completed, the firmware verifier 140 is configured to delete/erase the decrypted augmented firmware image 152 from the volatile memory 151 (e.g., in the cases where the complete decrypted augmented firmware image or blocks of decrypted augmented firmware image 152 is stored in the volatile memory 151). Further, the firmware verifier 140 is configured to issue/provide a boot command to the firmware updater 146 (in particular, to the HSM ROM 148) to boot up the HSM 106. Subsequently, the firmware verifier 140 waits until the firmware image 116 is accepted by the HSM 106 (which is confirmed by checking the read status register associated with the HSM 106). Once the firmware image 116 is accepted by the HSM 106, the firmware verifier 140 is configured to update a monotonic counter associated with the HSM 106 to indicate a version/version number of the firmware image 116. Once the monotonic counter is updated, the firmware verifier 140 is configured to clear the HSM flag associated with the memory 138 and exit the process for updating the firmware.

In some examples, by utilizing the system ROM (e.g., the firmware verifier 140) and the HSM ROM 148 to update the firmware for the HSM 106, the computing system 100 enables updating the firmware of the HSM 106 without the need for pre-programmed software. Further, by storing the decrypted augmented firmware image 152 in volatile memory (or by preventing the decrypted augmented firmware image 152 from being stored in the non-volatile memory) of the computing platform 104, the computing system 100 facilitates to update the HSM firmware securely. In particular, in one scenario, if a power failure occurs during the firmware update of the HSM 106, the decrypted augmented firmware image 152 is automatically removed from the volatile memory, thereby preventing the decrypted augmented firmware image 152 (e.g., unencrypted data) from being compromised. Furthermore, by signing the firmware image 116 before and after encryption, at the firmware generator 114, the computing system 100 allows decrypting the firmware image 116 (e.g., to form the decrypted augmented firmware image 152) at the firmware verifier 140 of the computing platform 104 before moving/copying the firmware image 116 to the HSM 106. Copying the decrypted version of the firmware image 116 to the HSM 106 enables to save the need to reserve additional memory in the HSM 106 to store the encrypted version of the firmware image 116. Further, in some examples, by verifying the version of the firmware image 116 before updating the HSM firmware, the computing system 100 supports roll-back protection. In addition, by verifying the bus ID, the computing system 100 allows only an authorized root of trust (e.g., the system ROM) to update the HSM firmware.

Figure 2A:
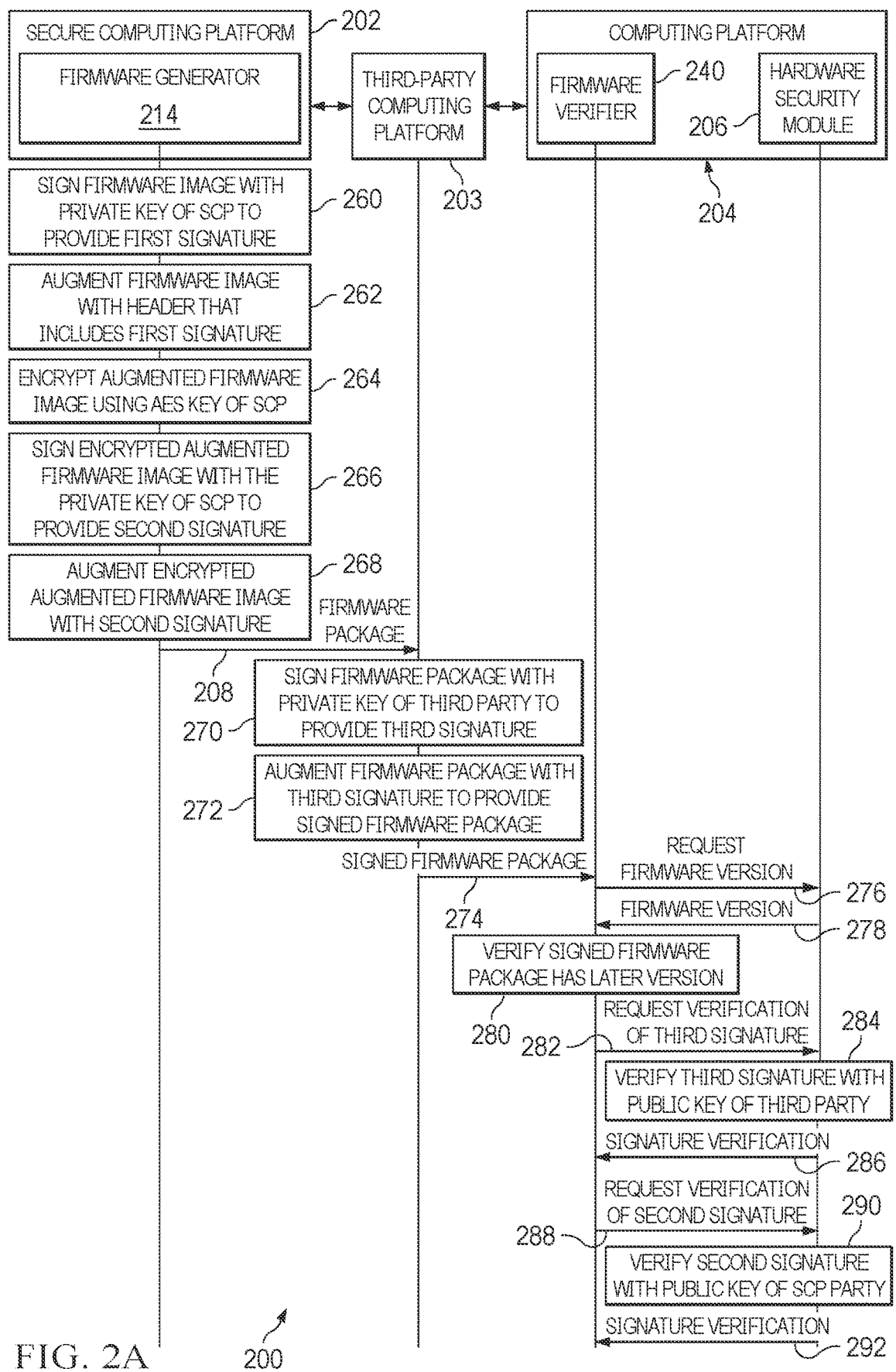
FIG. 2A and FIG. 2B illustrates a flow diagram for a computing system that illustrates a process for updating a firmware associated with a hardware security module (HSM).
Figure 2B:
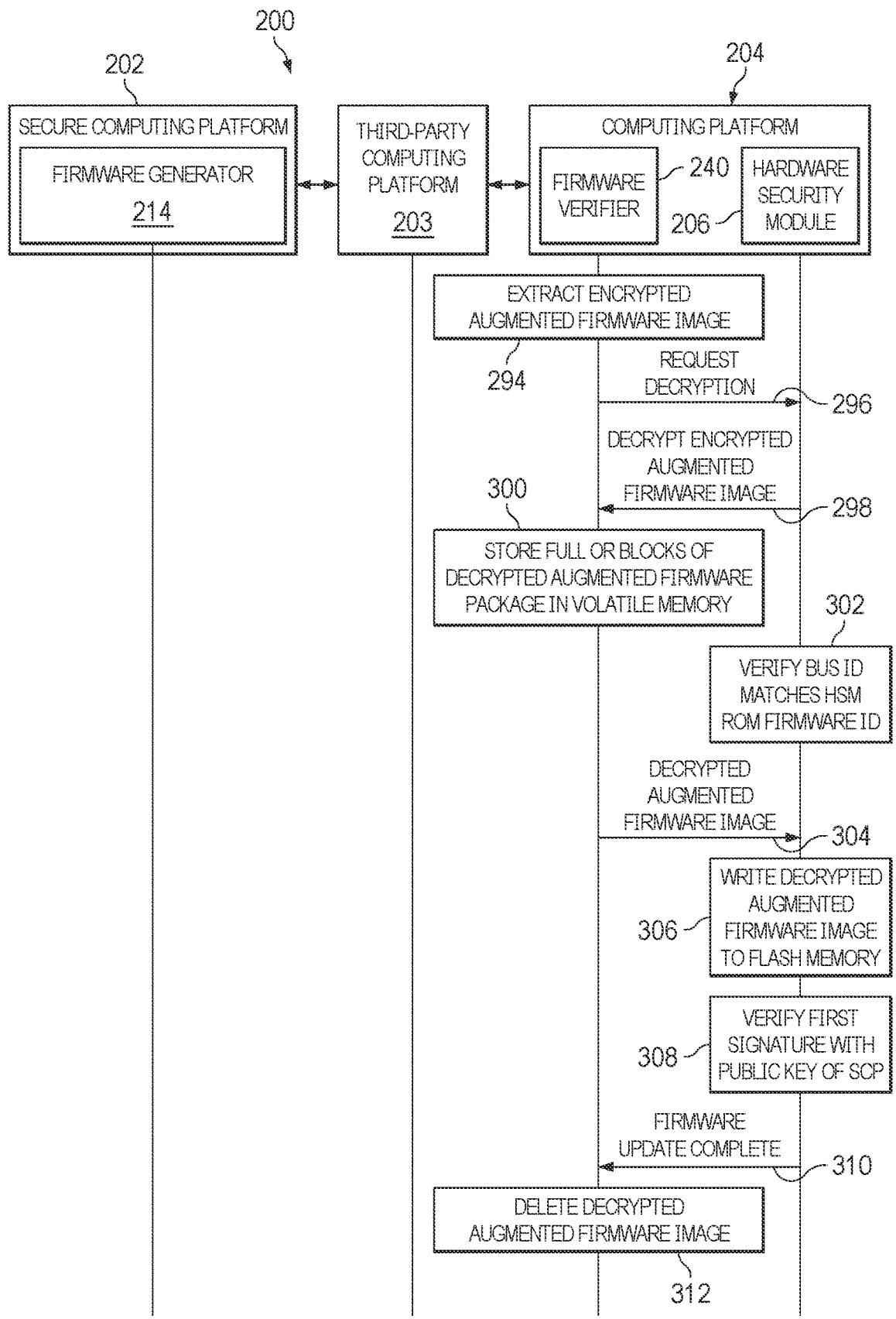

FIG. 2A and FIG. 2B illustrates a flow diagram 200 for a computing system that illustrates a process for updating a firmware associated with a hardware security module (HSM). The flow diagram 200 depicts the computing system including a secure computing platform 202, a third-party computing platform 203, and a computing platform 204. The secure computing platform 202 includes a firmware generator 214. Further, the computing platform 204 includes a firmware verifier 240 and an HSM 206. In some examples, the third-party computing platform 203 may be part of the secure computing platform 202. In this example, the computing system is similar to the computing system 100 in FIG. 1 and therefore, the features/functions of the computing system 100 is applicable herein.

At 260, the firmware generator 214 is configured to sign a firmware image (e.g., the firmware image 116 in FIG. 1) with a first private key (e.g., the private key 120 in FIG. 1) of a secure copy protocol (SCP) to provide a first signature. The first private key is associated with a first public key thereby forming a first public private key pair. At 262, the firmware generator 214 is configured to augment the firmware image with a header (the header 132 in FIG. 1) that includes the first signature to provide an augmented firmware image (e.g., the augmented firmware image 126 in FIG. 1). At 264, the firmware generator 214 is configured to encrypt the augmented firmware image using an AES key (e.g., the AES/symmetric key 122 in FIG. 1) of the SCP to provide an encrypted augmented firmware image (e.g., the encrypted augmented firmware image 130 in FIG. 1). At 266, the firmware generator 214 is further configured to sign the encrypted augmented firmware image with the first private key of the SCP to provide a second signature.

At 268, the firmware generator 214 is configured to augment the encrypted augmented firmware image with a header (e.g., the header 132 in FIG. 1) that includes the second signature to provide a firmware package 208 (e.g., the firmware package 108 in FIG. 1). At 270, the third-party computing platform 203 or the firmware generator 214 is configured to sign the firmware package 208 with a private key of a third party (e.g., a second private key) to provide a third signature. The second private key is associated with a second public key (or a public key of the third party), thereby forming a second public private key pair. At 272, the third-party computing platform 203 (or the firmware generator 214) is configured to augment the firmware package 208 with the third signature to provide a signed firmware package. In some examples, signing the firmware package 208 with the private key of the third party at 270 and augmenting the firmware package 208 with the third signature at 272 are omitted.

In some examples, the first public key, the AES key and the second public key are stored in an HSM asset store associated with the HSM 206. At 274, the firmware verifier 240 is configured to receive the signed firmware package from the firmware generator 214/the third-party computing platform 203. At 276, the firmware verifier 240 is configured to request a firmware version (in particular, request a version of the firmware stored in the HSM 206) to the HSM 206. At 278, the HSM 206 is configured to provide the firmware version to the firmware verifier 240. In particular, the HSM 206 is configured to provide a version/version number of the firmware stored within the HSM 206 to the firmware verifier 240. Although not mentioned herein, it is to be understood that the operations performed by the HSM 206 in FIG. 2A and FIG. 2B are performed by an HSM ROM (e.g., the HSM ROM 148 in FIG. 1) or a firmware updater (e.g., the firmware updater 146 in FIG. 1) associated with the HSM 206. Responsive to receiving the firmware version from the HSM 206, at 280, the firmware verifier 240 is configured to verify whether the signed firmware package has a later version or a same version. In particular, the firmware verifier 240 is configured to verify whether the version or the version number of the firmware image associated with the signed firmware package has later version/version number or a same version/version number compared to the version/version number received from the HSM 206.

In some examples, if it is determined at 280 that the signed firmware package does not have a later version or a same version compared to the version/version number received from the HSM 206, the firmware verifier 240 may not proceed further with the procedure of updating the firmware of the HSM 206, thereby providing rollback protection. However, if it is determined at 280 that the signed firmware package has a later version or a same version compared to the version/version number received from the HSM 206, the firmware verifier 240 proceeds to 282. At 282, the firmware verifier 240 is configured to request verification of the third signature of the signed firmware package to the HSM 206. Responsive to receiving the request to verify the third signature, at 284, the HSM 206 is configured verify the third signature using the public key of the third party (e.g., the second public key of the second public private key pair). Further, at 286, the HSM 206 is configured to provide a signature verification response to the firmware verifier 240. The signature verification response may indicate whether the verification of the third signature has passed or failed.

In examples where the signature verification response received at 286 indicates that the verification of the third signature has failed, the firmware verifier 240 may not proceed further with the procedure of updating the firmware of the HSM 206. Alternately, if the signature verification response received at 286 indicates that the verification of the third signature has passed, the firmware verifier 240 proceeds to 288. At 288, the firmware verifier 240 is configured to request verification of the second signature associated with the firmware package to the HSM 206.

Responsive to receiving the request to verify the second signature, at 290, the HSM 206 is configured verify the second signature using the first public key of the first public private key pair. Further, at 292, the HSM 206 is configured to provide a signature verification response to the firmware verifier 240. The signature verification response at 292 may indicate whether the verification of the second signature has passed or failed. If the signature verification response received at 292 indicates that the verification of the second signature has failed, the firmware verifier 240 may not proceed further with the procedure of updating the firmware of the HSM 206. Alternately, if the signature verification response received at 292 indicates that the verification of the second signature has passed, the firmware verifier 240 proceeds to 294 in FIG. 2B. Referring to FIG. 2B, at 294, the firmware verifier 240 is configured to extract the encrypted augmented firmware image from the firmware package. The encrypted augmented firmware image may be stored in a flash memory or RAM associated with the computing platform 204.

Responsive to extracting the encrypted augmented firmware image, at 296, the firmware verifier 240 is configured to request decryption of the encrypted augmented firmware package by the HSM 206. At 298, the HSM 206 (in particular, an HSM firmware updater in HSM ROM) is configured to decrypt the encrypted augmented firmware image using the symmetric key (e.g., the AES key) to provide the decrypted augmented firmware image. At 300, the firmware verifier 240 is configured to store the full/complete decrypted augmented firmware image or blocks of decrypted augmented firmware image in a volatile memory (e.g., the volatile memory 151 in FIG. 1). Responsive to providing the decrypted augmented firmware image by the HSM 206 although not shown here, the firmware verifier 240 may be configured to provide a command to the HSM 206 (in particular, the HSM ROM associated therewith) to initiate a transferring of the decrypted augmented firmware image to the HSM 206. Responsive to receiving the command to initiate the transferring, at 302, the HSM 206 is configured to confirm that a bus identifier (ID) of the transferring matches a read only memory (ROM) firmware ID of the HSM 206. In some examples, a bus ID matching the ROM firmware ID provides an indication to the HSM 206 that the command to initiate the transferring is received from a system ROM associated with the computing platform 204. In some examples, the bus ID is embedded in a system bus associated with the computing platform 204 and the HSM 206 is configured to verify the bus ID that is embedded in the system bus. Alternately, in other examples, the firmware verifier 240 may be configured to add the bus identifier (ID) to the command to initiate the transferring, wherein the bus ID matches the read only memory (ROM) firmware ID in the HSM 206. Responsive to the HSM 106 confirming that the bus ID of the transferring matches the ROM firmware ID of the HSM 206, at 304, the firmware verifier 240 is configured to transfer/copy the decrypted augmented firmware image (e.g., in full or block by block) to the HSM 206.

In some examples, prior to transferring the decrypted augmented firmware image to the HSM 206 at 304, although not shown here, the firmware verifier 240 may be configured to request verification of the first signature of the decrypted augmented firmware image to the HSM 206. Responsive to receiving the request to verify the first signature, the HSM 206 may be configured verify the first signature using the first public key of the first public private key pair. Responsive to verifying the first signature, the HSM 206 may be configured to provide a signature verification response to the firmware verifier 240. The signature verification response may indicate whether the verification of the first signature has passed or failed. In some examples, the firmware verifier 240 may be configured to transfer the decrypted augmented firmware image to the HSM 206, only when the signature verification response indicates that the verification of the first signature has passed.

Further, in some examples, prior to transferring the decrypted augmented firmware image to the HSM 206 at 304, although not shown here, the firmware verifier 240 may be configured to request the firmware version (in particular, request the version of the firmware stored in the HSM 206) to the HSM 206. In response, the HSM 206 may be configured to provide the firmware version to the firmware verifier 240. In some examples, the firmware verifier 240 may be configured to transfer the decrypted augmented firmware image to the HSM 206, only when the version of the firmware image associated with the decrypted augmented firmware image is later than or equal to the version of the firmware stored in the HSM 106.

Responsive to transferring the decrypted augmented firmware image to the HSM 206, at 306, the HSM 206 (e.g., a firmware updater associated therewith) is configured to write the decrypted augmented firmware image (e.g., in full or block by block) to a memory location (e.g., a flash memory) in an HSM firmware region (e.g., the HSM firmware region 150 in FIG. 1) associated with the HSM 206. Alternately, in some examples, although not shown here, at 306, the firmware verifier 240 may be configured to write the decrypted augmented firmware image (e.g., in full or block by block) to a memory location (e.g., a flash memory) in an HSM firmware region (e.g., the HSM firmware region 150 in FIG. 1) associate with the HSM 206. In some examples, the decrypted augmented firmware image overwrites/replaces a firmware already stored in the HSM firmware region of the HSM 206. Responsive to writing the decrypted augmented firmware image, at 308, the HSM 206 is configured to verify the first signature of the decrypted augmented firmware image using the first public key of the first public private key pair. The first public key of the first public private key pair may be stored in an HSM asset store of the HSM 206.

Responsive to passing the verification of the first signature, at 310, the HSM 206 is configured to provide a firmware update complete indication (or an indication that the writing is completed) to the firmware verifier 240. Responsive to receiving the firmware update complete indication (or the indication that the writing is completed), at 312, the firmware verifier 240 is configured to delete/erase the full or residual decrypted augmented firmware image from the volatile memory/RAM associated with the computing platform 204.

Figure 3:
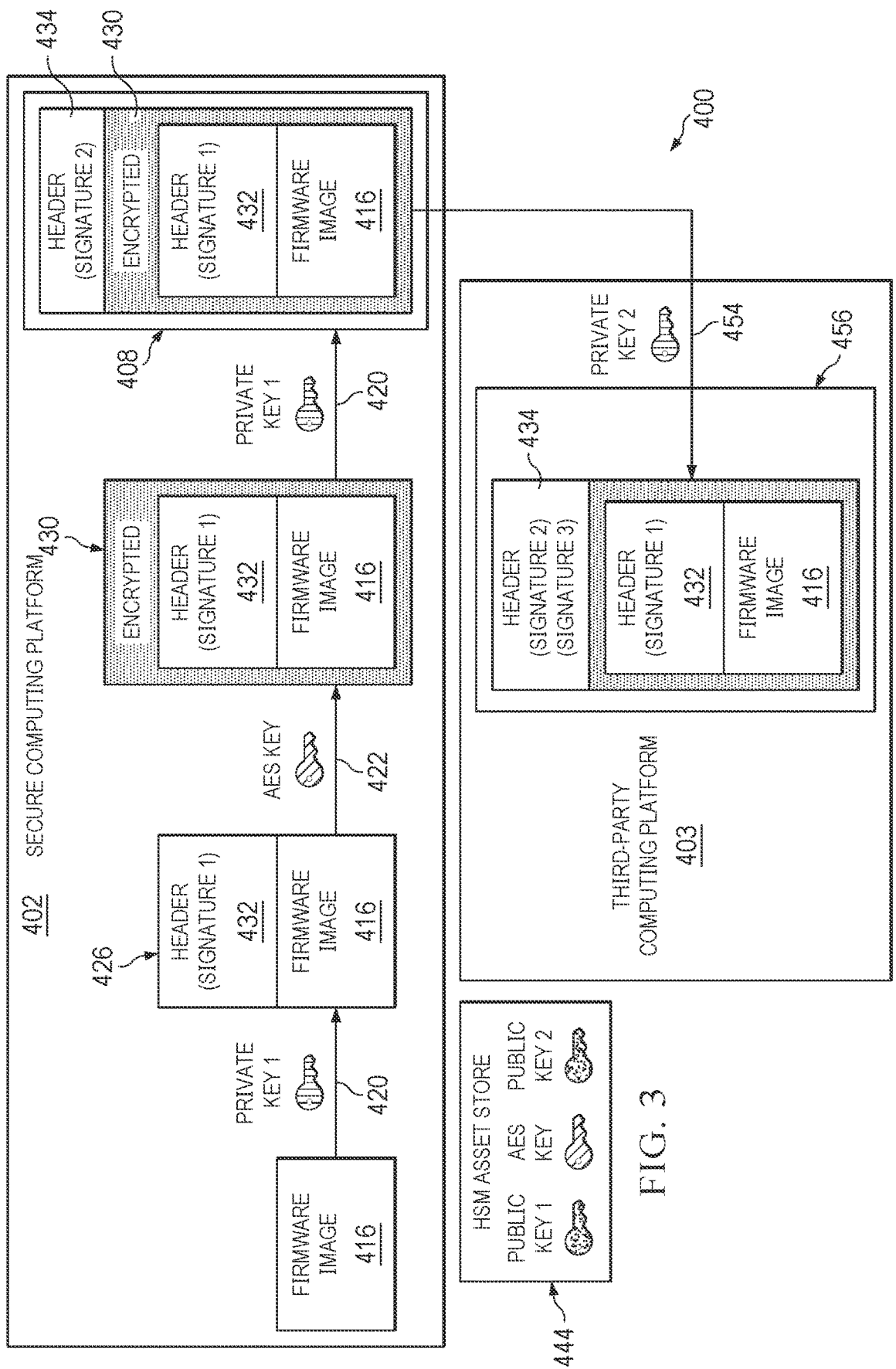
FIG. 3 depicts a block diagram to depict the procedure to form a signed firmware package.

FIG. 3 to FIG. 10 illustrates various steps in updating an HSM firmware. In some examples, the various steps depicted in FIG. 3 to FIG. 10 may correspond to one or more steps illustrated in the flow diagram 200 in FIG. 2A and FIG. 2B. FIGS. 3 to 10 depict a sequential relationship with respect to one another and FIGS. 3 to 10 use the same numbering to depict the same structure. All the features of the computing system 100 in FIG. 1 are also applicable to FIGS. 3 to 10. FIG. 3 depicts a block diagram 400 to illustrate the procedure to form a signed firmware package. As can be seen in FIG. 3, the firmware image 416 is signed using the private key 1 420 (e.g., the first private key of a first public private key pair) to provide a signature 1 (e.g., the first signature). Subsequently, the firmware image 416 is augmented with a header 432 that includes the signature 1 (e.g., the first signature) to provide the augmented firmware image 426.

The augmented firmware image 426 is encrypted using an AES key 422 (e.g., a symmetric key) to form the encrypted augmented firmware image 430. The encrypted augmented firmware image 430 is signed using the private key 1 420 (e.g., the first private key) to provide a signature 2 (e.g., the second signature). The encrypted augmented firmware image 430 is augmented with the header 434 that includes signature 2 (e.g., the second signature) to provide a firmware package 408. The firmware package 408 is signed using the private key 2 454 (e.g., a second private key of a second public private key pair) to provide signature 3 (e.g., the third signature). The firmware package 408 is augmented with signature 3 (i.e., the third signature) in the header 434 to provide the signed firmware package 456. The public key 1 (e.g., a first public key of the first public private key pair), the AES key and a public key 2 (e.g., a second public key of the second public private key pair) are stored in the HSM asset store 444.

Figure 4:
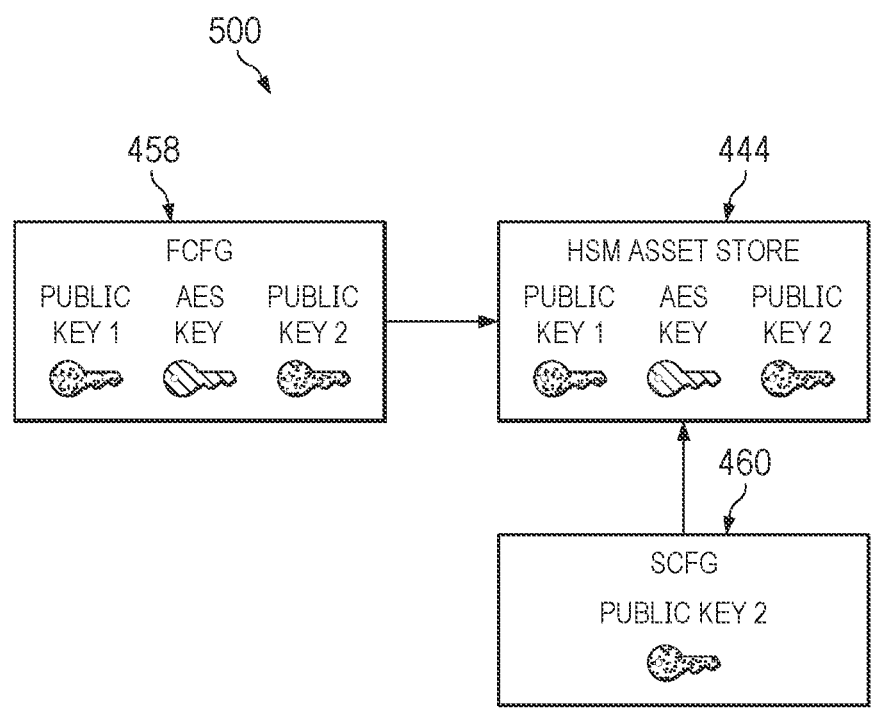
FIG. 4 illustrates a transfer procedure of various keys to an HSM asset store.

FIG. 4 illustrates a transfer procedure 500 of the various keys to the HSM asset store 444 associated with an HSM (e.g., the HSM 106 in FIG. 1). In particular, the public key 1 and the AES key are copied by a firmware verifier (e.g., the firmware verifier 140 in FIG. 1) from an FCFG region 458 to the HSM asset store 444. Similarly, the public key 2 is copied by the firmware verifier from an SCFG region 460 to the HSM asset store 144.

Figure 5:
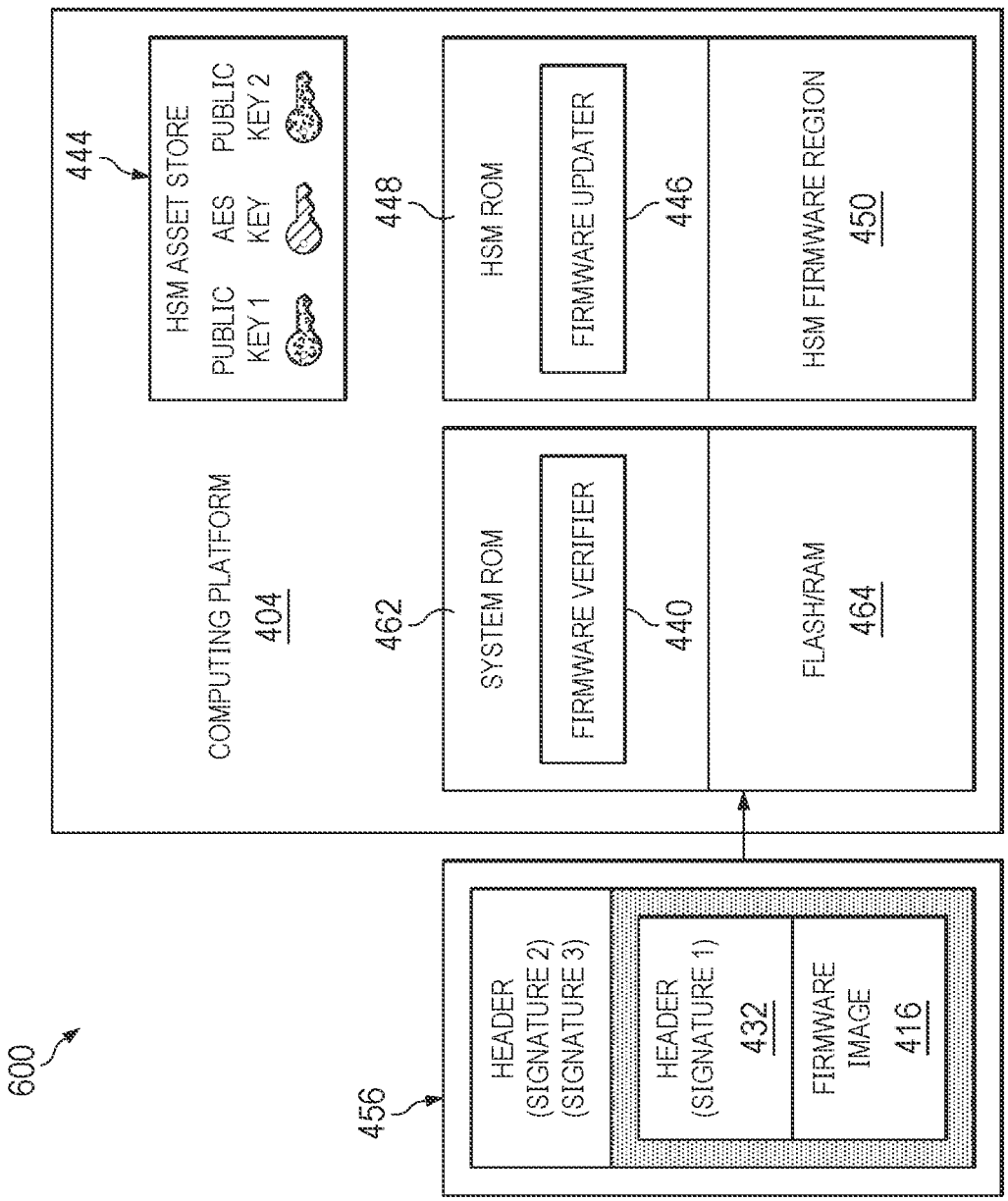
FIG. 5 illustrates an example of a receipt of a signed firmware package at a computing platform.

FIG. 5 depicts an example illustration 600 of the receipt of the signed firmware package 456 at the computing platform 404. As can be seen in FIG. 5, the signed firmware package 456 is received at a firmware verifier 440. Receiving the signed firmware package 456 at the firmware verifier 440 includes downloading the signed firmware package 456 into a memory (e.g., the memory 138 in FIG. 1) associated with the computing platform. The memory includes a system ROM 462 and a FLASH/RAM memory 464 which includes a Flash memory and a RAM. The firmware verifier 440 is configured to download the signed firmware package 456 to the flash memory or the RAM associated with the FLASH/RAM memory 464.

Figure 6:
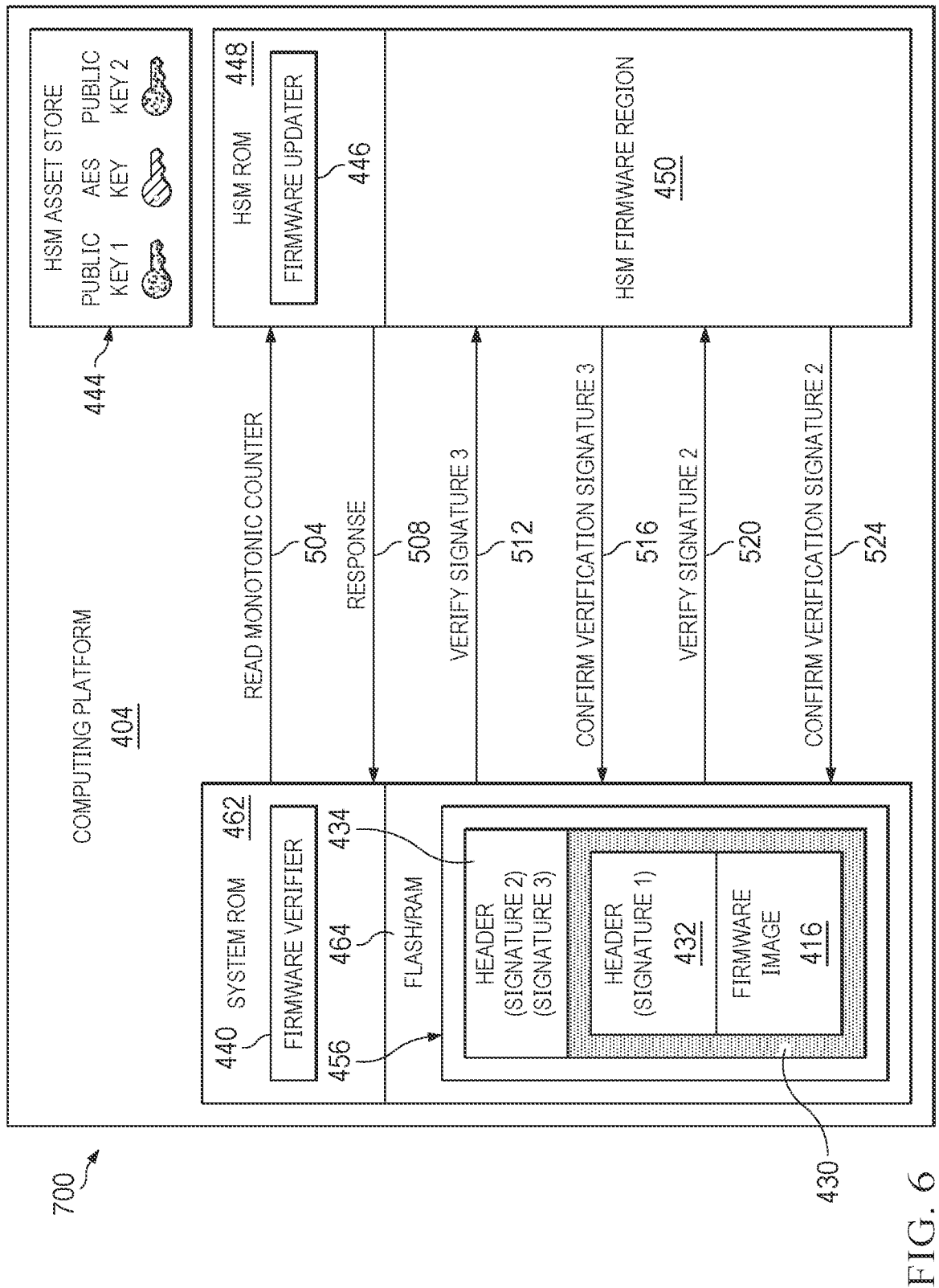
FIG. 6 illustrates an example of verifying a firmware version and signatures at a computing platform.

FIG. 6 depicts an example illustration 700 of verifying the firmware version and signatures at the computing platform 404. As can be seen in FIG. 6, the system ROM 462 (in particular, the firmware verifier 440) provides a request 504 to read a monotonic counter to the HSM ROM 448 (in particular, the firmware updater 446). The HSM ROM 448 is part of an HSM (e.g., the HSM 206 in FIG. 2A and FIG. 2B). The HSM further includes the HSM firmware region 450 and the HSM asset store 444. Reading the monotonic counter provides a version (e.g., a version number) of the firmware already stored in the HSM firmware region 450. Responsive to receiving the request 504 to read the monotonic counter, the HSM ROM 448 (in particular, the firmware updater 446) is configured to provide a response 508 to the system ROM 462 (in particular, the firmware verifier 440). The response 508 includes the version or the version number of the firmware that is already stored in the HSM firmware region 450. If no firmware is stored in the HSM firmware region 450, then the response 508 may not return a version number (or the version number is 0).

Responsive to receiving the response 508, the system ROM 462 (in particular, the firmware verifier 440) is configured to compare the version number included in the response 508 to the version/version number of the firmware image 416 in the signed firmware package 456 and verify if the version/version number of the firmware image 416 in the signed firmware package 456 is later than or equal to the version/version number included in the response 508. The version/version number of the firmware image 416 in the signed firmware package 456 may be included in the header 432 associated with the signed firmware package 456. The system ROM 462 (in particular, the firmware verifier 440) is further configured to provide a verify signature 3 request 512 to the HSM ROM 448 (in particular, the firmware updater 446), in order to verify the signature 3 included in the header 434 associated with the signed firmware package 456. In some examples, Rivest-Shamir-Adleman (RSA) signature verification is implemented to verify signature 3. Responsive to receiving the verify signature 3 request 512, the HSM ROM 448 (in particular, the firmware updater 446) is configured to provide a confirmation 516 of the verification of signature 3 to the system ROM 462 (in particular, the firmware verifier 440). The confirmation 516 of the verification of signature 3 may indicate whether the verification of signature 3 has passed or failed.

The system ROM 462 (in particular, the firmware verifier 440) is further configured to provide a verify signature 2 request 520 to the HSM ROM 448 (in particular, the firmware updater 446), in order to verify the signature 2 included in the header 434 associated with the signed firmware package 456. In some examples, RSA signature verification is implemented to verify signature 2. Responsive to receiving the verify signature 2 request 520, the HSM ROM 448 (in particular, the firmware updater 446) is configured to provide a confirmation 524 of the verification of signature 2 to the system ROM 462 (in particular, the firmware verifier 440). The confirmation 524 of the verification of signature 2 may indicate whether the verification of signature 2 has passed or failed.

Figure 7:
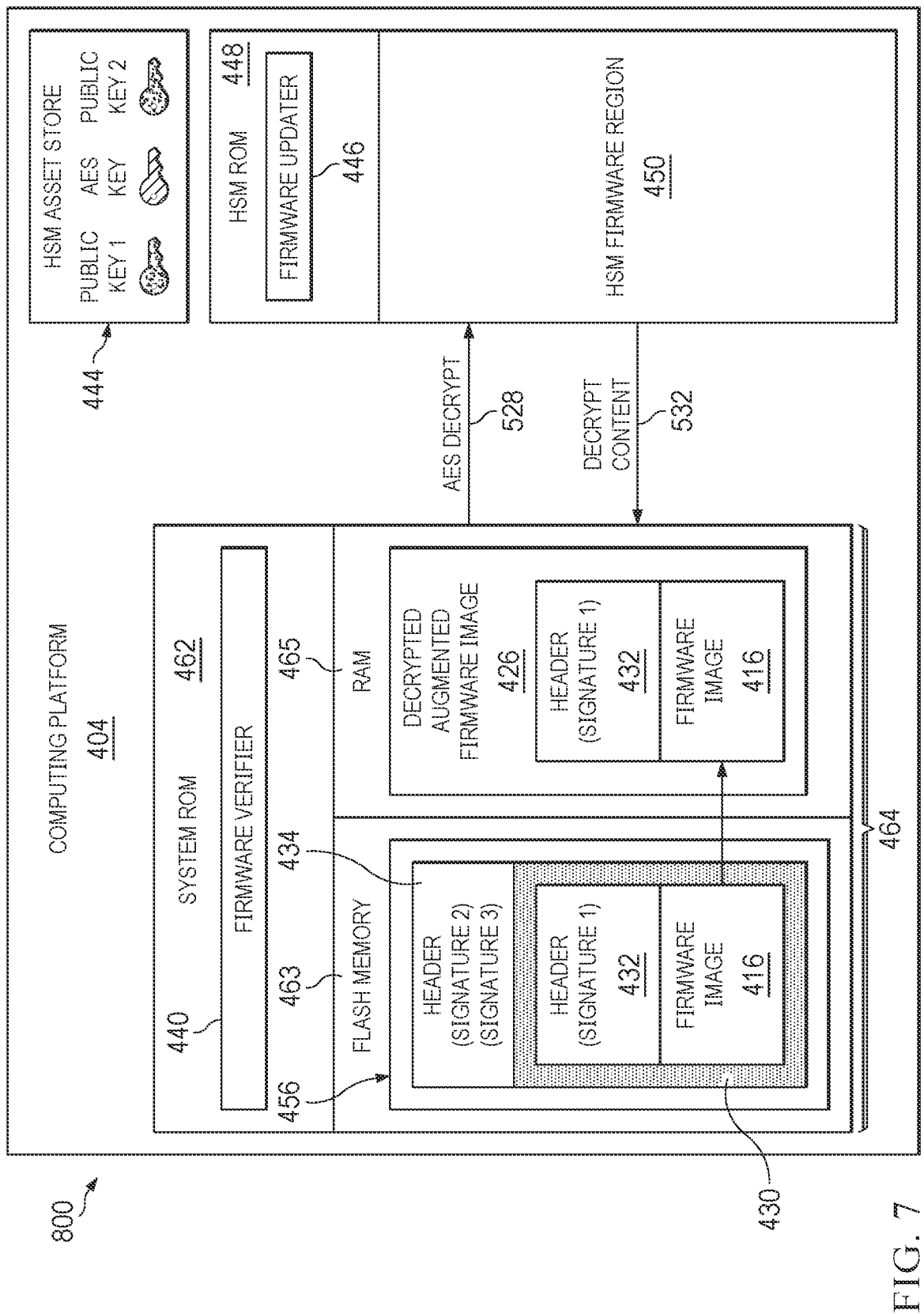
FIG. 7 depicts an example illustration of the decryption of an encrypted augmented firmware image at a computing platform.

FIG. 7 depicts an example illustration 800 of the decryption of the encrypted augmented firmware image 430 at the computing platform 104. As can be seen in FIG. 7, the system ROM 462 (in particular, the firmware verifier 440) is configured to provide an advanced encryption standard (AES) decrypt request 528 to the HSM ROM 448 (in particular, the firmware updater 446). Responsive to receiving the AES decrypt request 528, the HSM ROM 448 (in particular, the firmware updater 446) is configured to decrypt the encrypted augmented firmware image 430 using the AES key stored in the HSM asset store 444 to provide the decrypted augmented firmware image 426. The decrypted augmented firmware image 426 in FIG. 7 and the augmented firmware image 426 in FIG. 3 are the same and therefore, the same numbering is used herein. In this example, the full decrypted augmented firmware image 426 is stored in RAM 465 (e.g., a volatile memory) of the FLASH/RAM memory 464. The FLASH/RAM memory 464 further includes the flash memory 463 (e.g., a non-volatile memory). Alternately, in other examples, the full decrypted augmented firmware image 426 is not stored in the RAM 465 but instead blocks of the decrypted augmented firmware image 426 may be stored in the RAM 465 and transferred to the HSM to be written to the HSM firmware region 450; this option is considered in computing platforms that don't have sufficient volatile memory/RAM to hold the full decrypted augmented firmware image. Writing blocks of decrypted augmented firmware image in volatile memory constrained devices is made possible with the firmware updater 446 supporting all cryptographic and firmware update functions needed (including HSM FW decryption, verification and writing to HSM flash region) and with the verification of second signature which confirms that a valid firmware image is received before starting to over-write the HSM firmware region. Further, in some examples, neither the full decrypted augmented firmware image 426 nor blocks of the decrypted augmented firmware image 426 is stored in the RAM 465, but instead the firmware updater 446 decrypts the encrypted augmented firmware image 430 and writes the decrypted augmented firmware image 426 directly into the HSM firmware region 450.

Figure 8:
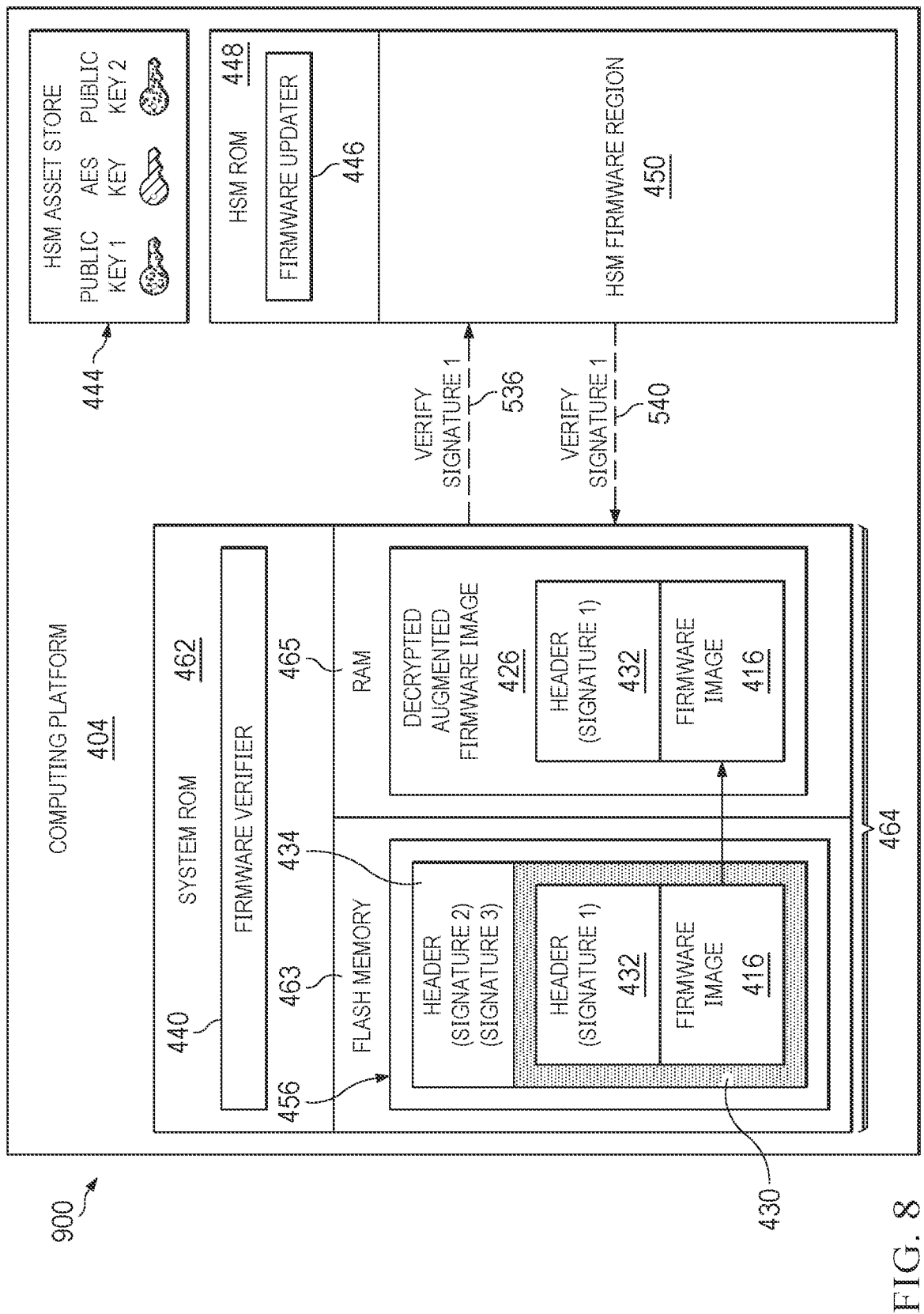
FIG. 8 depicts an example illustration of the verification of a first signature at a computing platform.

FIG. 8 depicts an example illustration 900 of the verification of the first signature at the computing platform 404, when the full decrypted augmented firmware image 426 is stored in RAM 465 (e.g., a volatile memory). As can be seen in FIG. 8, the system ROM 462 (in particular, the firmware verifier 440) is optionally configured to provide a verify signature 1 request 536 to the HSM ROM 448 (in particular, the firmware updater 446), in order to verify the signature 1 included in the header 432 associated with the decrypted augmented firmware image 426. In some examples, Rivest-Shamir-Adleman (RSA) signature verification is implemented to verify signature 1. The HSM ROM 448 (in particular, the firmware updater 446) is configured to verify the signature 1 by using the public key 1 stored in the HSM asset store 444. Responsive to verifying the signature 1, the HSM ROM 448 (in particular, the firmware updater 446) is configured to provide a confirmation 540 of the verification of signature 1 to the system ROM 462 (in particular, the firmware verifier 440). The confirmation 540 of the verification of signature 1 may indicate whether the verification of signature 1 has passed or failed.

Figure 9A:
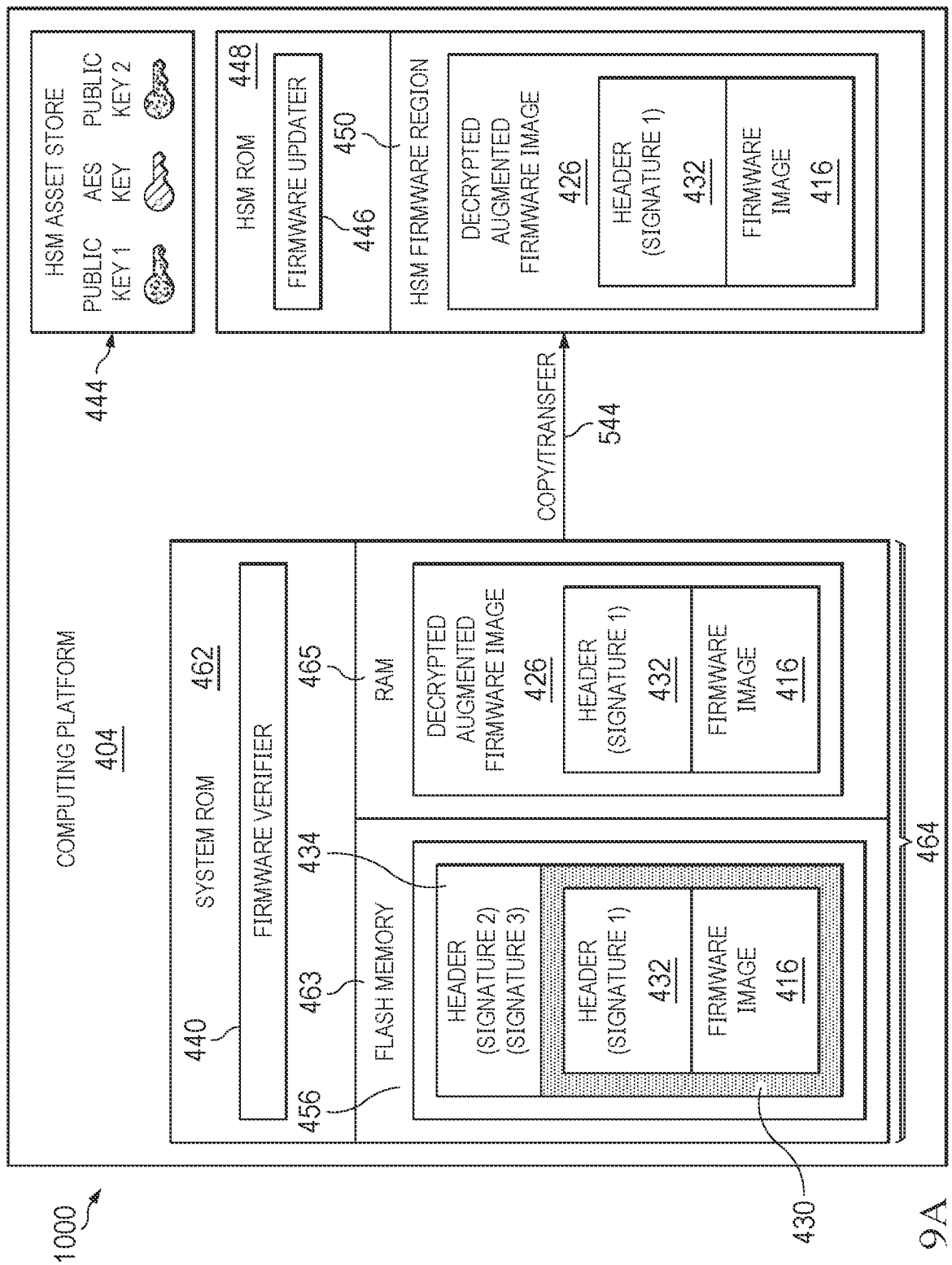
FIG. 9A depicts an example illustration of the procedure for transferring of a decrypted augmented firmware image that is stored in a volatile memory to an HSM.
Figure 9B:
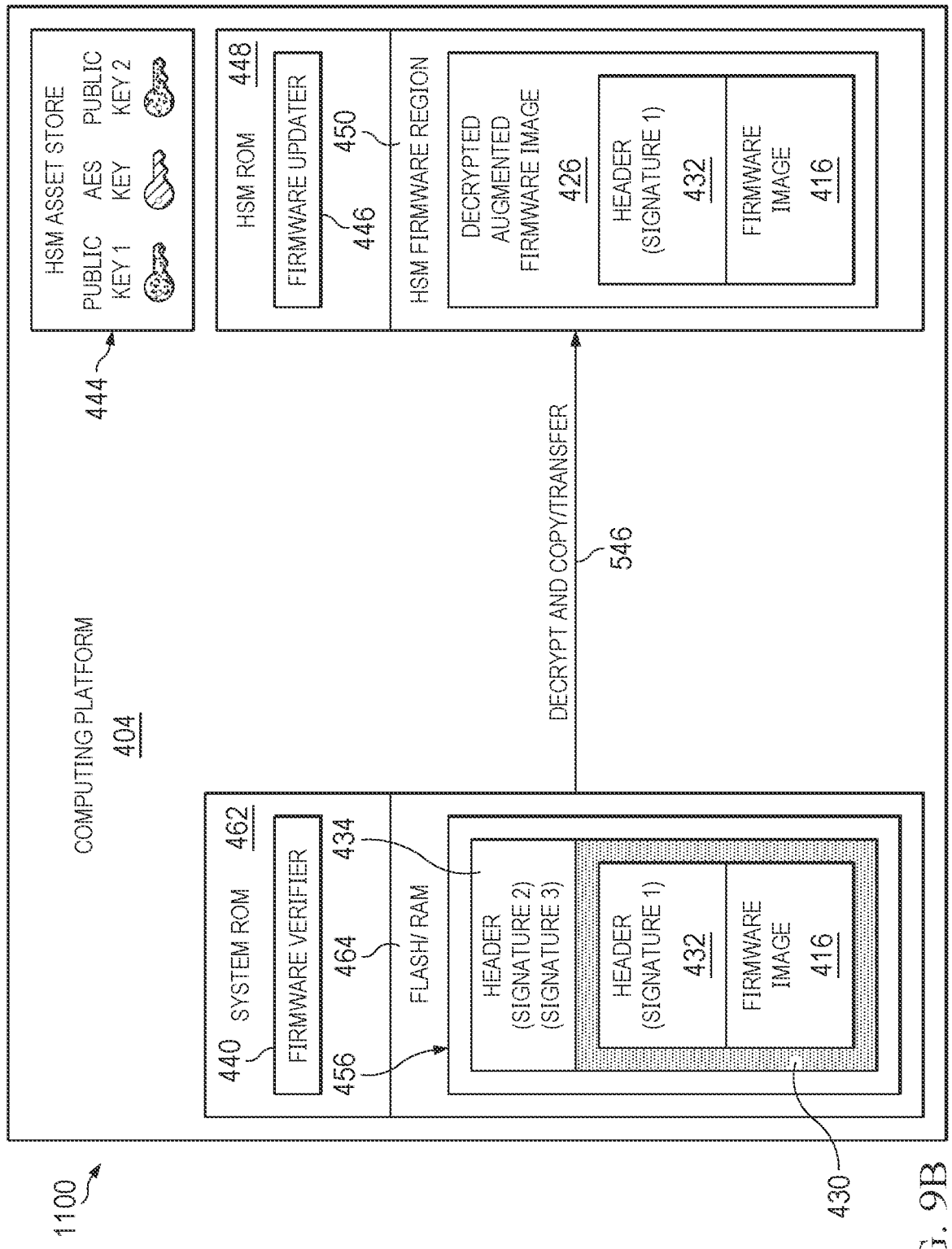
FIG. 9B depicts an example illustration of the procedure for transferring a decrypted augmented firmware image directly to the HSM, without storing the decrypted augmented firmware image in the volatile memory.

FIG. 9A depicts an example illustration 1000 of the procedure for transferring of the decrypted augmented firmware image that is stored in a volatile memory to the HSM. As can be seen in FIG. 9A, the decrypted augmented firmware image 426 that is stored in the volatile memory/RAM 465 is copied/transferred from the RAM 465 to the HSM firmware region 450 via the copy/transfer message 544. In some examples, a full/complete decrypted augmented firmware image 426 is stored in the volatile memory/RAM 465 and the full/complete decrypted augmented firmware image 426 is copied/transferred from the RAM 465 to the HSM firmware region 450 via the copy/transfer message 544. Alternately, in other examples, blocks of the decrypted augmented firmware image 426 is stored in the volatile memory/RAM 465 as and when they are decrypted, and the blocks of the decrypted augmented firmware image 426 are then copied/transferred from the RAM 465 to the HSM firmware region 450 via the copy/transfer message 544. FIG. 9B depicts an example illustration 1100 of the procedure for transferring the decrypted augmented firmware image 426 directly to the HSM, without storing the full decrypted augmented firmware image 426 or blocks of the decrypted augmented firmware image 426 in the volatile memory. As can be seen in FIG. 9B, the encrypted augmented firmware image 430 is decrypted by the firmware updater 446 to provide the decrypted augmented firmware image 426 and the decrypted augmented firmware image 426 is directly copied/transferred to the HSM firmware region 450 via the decrypt and copy/transfer message 546, in turn writing the decrypted augmented firmware image 426 to the HSM firmware region 450.

Figure 10:
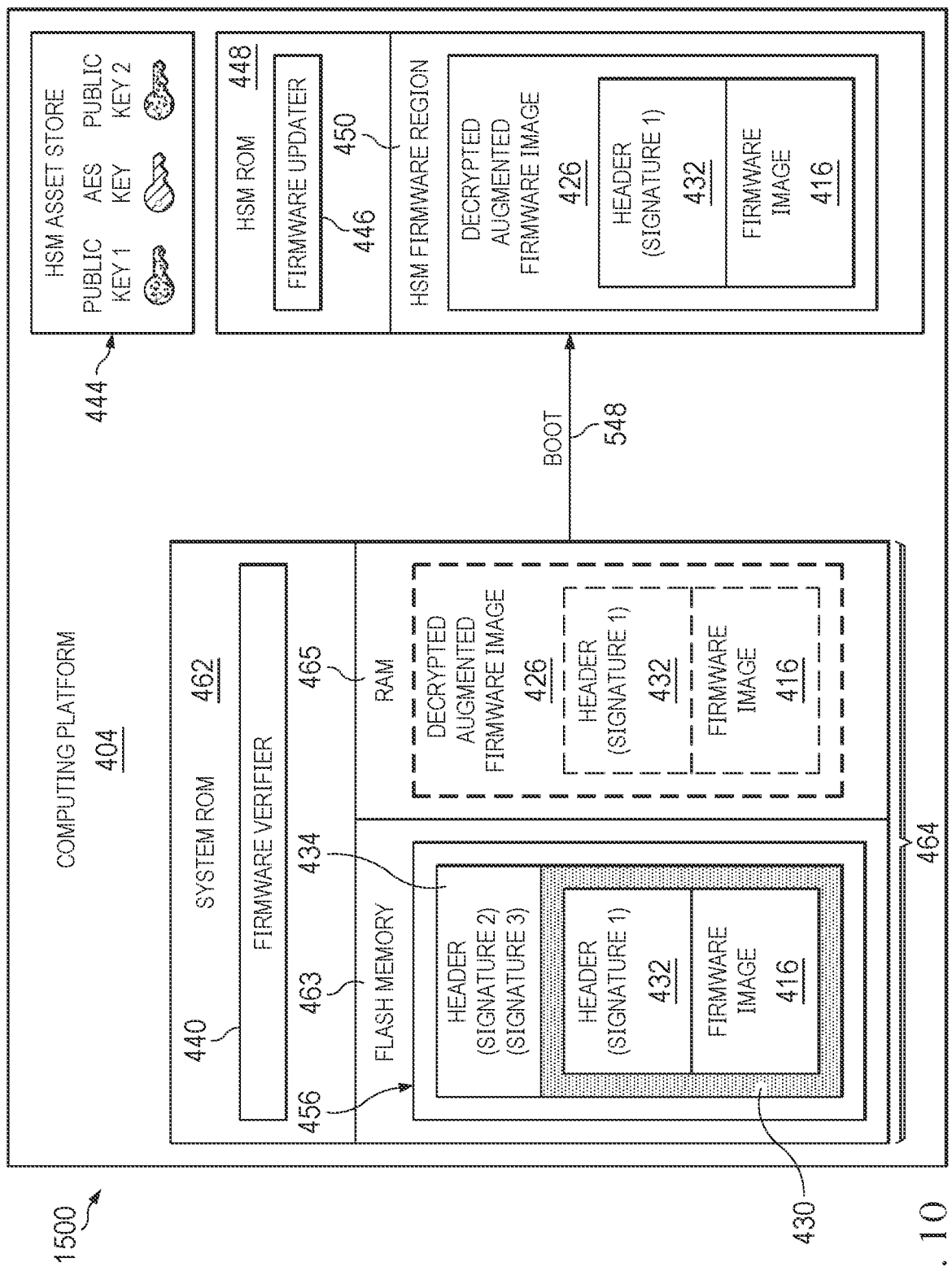
FIG. 10 depicts an example illustration of the procedure for deleting decrypted augmented firmware image from a volatile memory/RAM associated with a computing platform.

FIG. 10 depicts an example illustration 1500 of the procedure for deleting the decrypted augmented firmware image 426 from the volatile memory/RAM 465 associated with the computing platform 404. As can be seen in FIG. 10, the decrypted augmented firmware image 426 is deleted/erased from the RAM 465. In some examples, the firmware verifier 440 is configured delete/erase the full or residual decrypted augmented firmware image 426 responsive to receiving an indication from the HSM ROM 448 (in particular, the firmware updater 446) that the writing and valid signature verification of the decrypted augmented firmware image 426 is completed. In some examples, as can be seen in FIG. 10, the firmware verifier 440 is further configured to provide a boot command 548 to the HSM ROM 448 (in particular, the firmware updater 446) to boot up the HSM using the updated firmware (e.g., the firmware image 416). Responsive to providing the boot command 548, the firmware verifier 440 waits until the firmware image 416 is accepted by the HSM (verified by checking the read status register associated with the HSM). Responsive to the firmware image 416 being accepted by the HSM, the firmware verifier 440 is configured to update a monotonic counter associated with the HSM to indicate/reflect a version/version number of the firmware image 416. Once the monotonic counter is updated, the firmware verifier 440 is configured to clear an HSM flag associated with the computing platform 404 and exit the process for updating the firmware.

Figure 11:
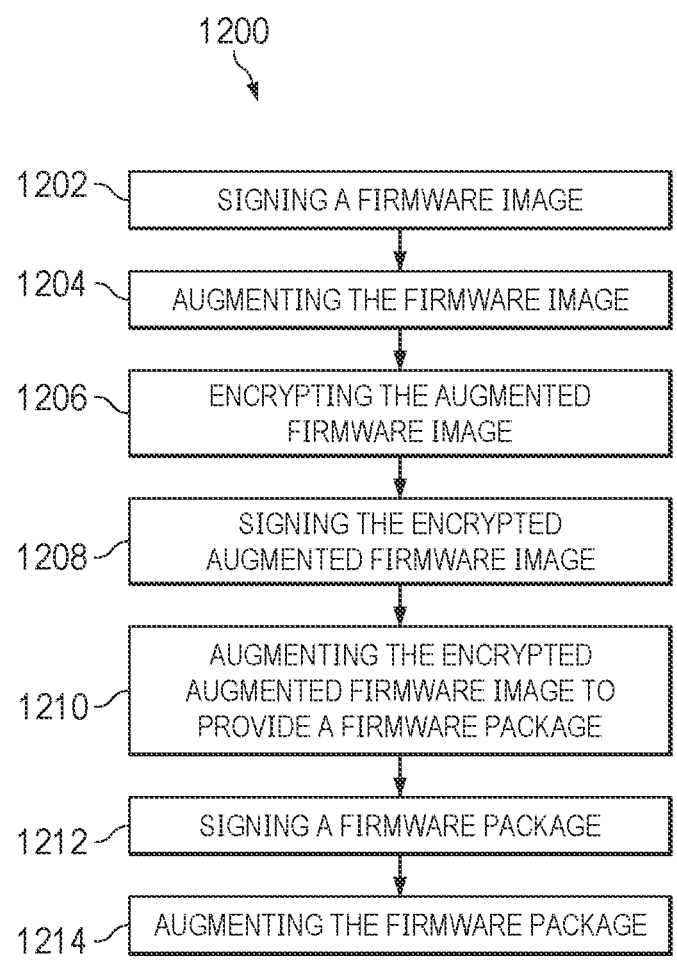
FIG. 11 illustrates a flowchart for an example method for generating a firmware package to be utilized for updating a firmware associated with a hardware security module (HSM).

FIG. 11 illustrates a flowchart for a method 1200 for generating a firmware package to be utilized for updating a firmware associated with a hardware security module (HSM). In some examples, the method 1200 may be implemented using the firmware generator 114 in FIG. 1. The method 1200 is explained herein with reference to the computing system 100 in FIG. 1 and the secure computing platform 402 in FIG. 3, for clarity. At 1202, a firmware image (e.g., the firmware image 416 in FIG. 3) is signed using a first private key (e.g., the private key 1 420 of FIG. 3) of a first public private key pair to provide a first signature (e.g., the SIGNATURE 1 in FIG. 3). At 1204, the firmware image is augmented with a header (e.g., the header 432 in FIG. 3) that includes the first signature to provide an augmented firmware image (e.g., the augmented firmware image 426 in FIG. 3). At 1206, the augmented firmware image is encrypted with a symmetric key (e.g., the AES key 422 in FIG. 3) to provide an encrypted augmented firmware image (e.g., the encrypted augmented firmware image 430 in FIG. 3). At 1208, the encrypted augmented firmware image is signed with the first private key of the first public private key pair to provide a second signature (e.g., the SIGNATURE 2 in FIG. 3). At 1210, the encrypted augmented firmware image is augmented with the second signature to provide a firmware package (e.g., the firmware package 408 in FIG. 3). At 1212, the firmware package is signed with a second private key (e.g., the private key 2 454 in FIG. 3) of a second public private key pair to provide a third signature (e.g., the SIGNATURE 3 in FIG. 3). In some examples, the second public private key pair is associated with a customer.

At 1214, the firmware package is augmented with the third signature to provide a signed firmware package (e.g., the signed firmware package 456 in FIG. 3). In some examples, signing the firmware package with the second private key to provide the third signature (e.g., at 1212) and augmenting the firmware package with the third signature to provide the signed firmware package (e.g., at 1214) are omitted.

Figure 12:
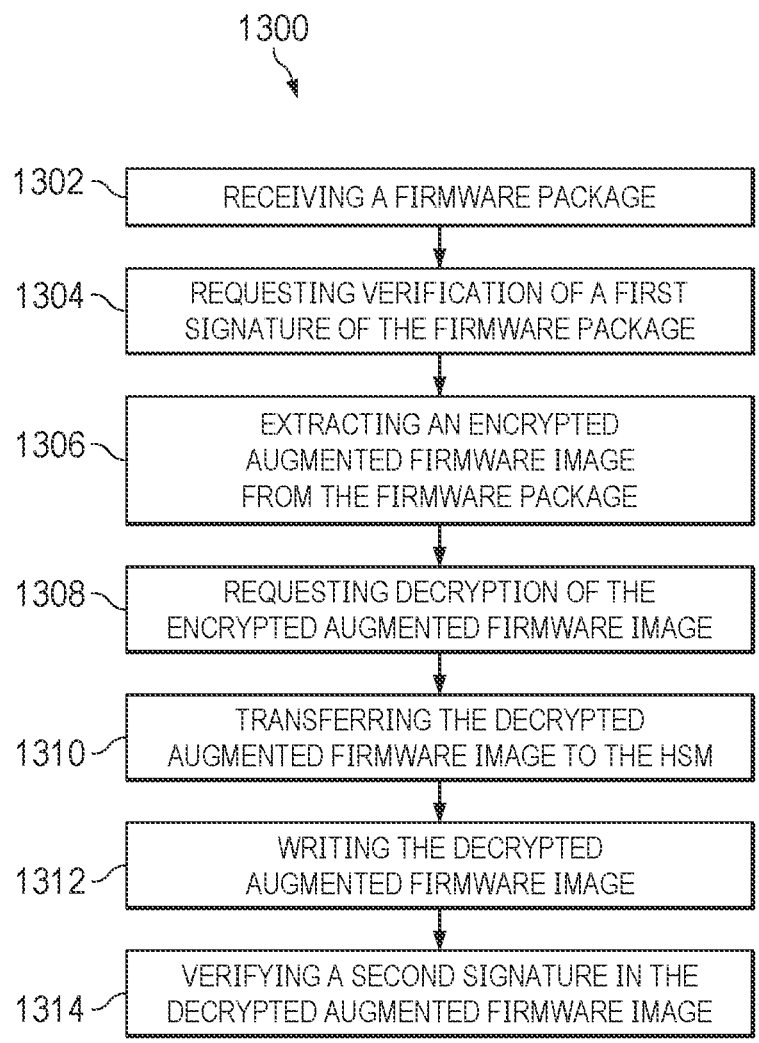
FIG. 12 illustrates a flowchart for an example method for verifying a firmware image to be utilized for updating a firmware associated with a hardware security module (HSM).

FIG. 12 illustrates a flowchart for a method 1300 for verifying a firmware image to be utilized for updating a firmware associated with a hardware security module (HSM). In some examples, the method 1300 may be implemented using the firmware verifier 140 and the firmware updater 146 in FIG. 1. The method 1300 is explained herein with reference to FIG. 1, FIG. 3, and FIGS. 6-10, for clarity. At 1302, a firmware package is received (e.g., downloaded to a FLASH/RAM memory 464 associated with the computing platform 404 in FIG. 6) using the firmware verifier (e.g., the firmware verifier 440 in FIG. 6). In some examples, the firmware package corresponds to the signed firmware package 456 in FIG. 6 that includes the SIGNATURE 1, the SIGNATURE 2 and the SIGNATURE 3. Alternately, in other examples, the firmware package may correspond to the firmware package 408 in FIG. 3 which includes the SIGNATURE 1 and the SIGNATURE 2, but not the SIGNATURE 3.

At 1304, a verification of a first signature (e.g., the SIGNATURE 2 in FIG. 6) of the firmware package by an HSM is requested (e.g., via the request 610 in FIG. 6) using the firmware verifier. It is noted that the ordinal numbers first, second and third to refer to the signatures used herein are not intended to have a temporal relationship but are used herein just for distinction purposes. The HSM uses a first public key (e.g., the PUBLIC KEY 1 in FIG. 6) of a first public-private key pair to verify the first signature. The first public key is a public key associated with a vendor. At 1306, an encrypted augmented firmware image (e.g., the encrypted augmented firmware image 430 in FIG. 7) is extracted from the firmware package responsive to an indication (e.g., the confirmation 524 in FIG. 6) from the HSM that the first signature is verified.

At 1308, a decryption of the encrypted augmented firmware image by the HSM is requested (e.g., via the decrypt request 528 in FIG. 7) using the firmware verifier. The HSM uses a symmetric key (e.g., the AES key in FIG. 7) to provide a decrypted augmented firmware image (e.g., the decrypted augmented firmware image 426 in FIG. 7) in response to the request for decryption. At 1310, the decrypted augmented firmware image is transferred (e.g., via the copy/transfer message 544 in FIG. 9A or via the decrypt and copy/transfer message 546 in FIG. 9B) to the HSM (e.g., to the HSM firmware region 450 in FIG. 9A or FIG. 9B) using the firmware verifier. In particular, in some examples, the full decrypted augmented firmware image is stored (or staged) in a volatile memory, before transferring the full decrypted augmented firmware image to the HSM. Alternately, in other examples, blocks of decrypted augmented firmware image are stored in volatile memory/RAM and then transferred to the HSM without storing the full decrypted augmented firmware image in the volatile memory. Further, in some examples, the decrypted augmented firmware image is transferred to the HSM without storing the full decrypted augmented firmware image or blocks of the decrypted augmented firmware image in the volatile memory. At 1312, the decrypted augmented firmware image is written to the HSM (e.g., to the HSM firmware region 450 in FIG. 9A or FIG. 9B) using the firmware updater/firmware verifier. In the examples where the firmware package received at 1302 includes a third signature (e.g., the SIGNATURE 3 as in the signed firmware package 456 in FIG. 6), a verification of the third signature by the HSM is requested (e.g., via the request 512 in FIG. 6) using the firmware verifier, prior to the requesting of the verification of the first signature at 1304. In particular, the requesting of the verification of the first signature of the firmware package is executed responsive to an indication from the HSM that the third signature is verified (e.g., via the confirmation 516 in FIG. 6). At 1314, a second signature (e.g., the SIGNATURE 1 in FIG. 9A or FIG. 9B) in the decrypted augmented firmware image is verified using the first public key (e.g., the PUBLIC KEY 1 in FIG. 9A or FIG. 9B) by a firmware updater (e.g., the firmware updater 446 in FIG. 9A or FIG. 9B).

Modifications are possible in the described embodiments, and other embodiments are possible, within the scope of the claims.

What is claimed is:

1. A non-transitory machine-readable medium having machine-readable instructions comprising a firmware verifier, the machine-readable instructions for the firmware verifier being executable by a processor core to perform operations comprising:
    requesting verification of a first signature of a firmware package for a hardware security module (HSM) by the HSM, wherein the HSM uses a public key of a public-private key pair to verify an integrity of the firmware package;
    extracting an encrypted augmented firmware image from the firmware package responsive to an indication from the HSM that the first signature is verified;
    requesting decryption of the encrypted augmented firmware image by the HSM, wherein the HSM uses a symmetric key to provide a decrypted augmented firmware image in response to the request for decryption; and
    transferring the decrypted augmented firmware image to the HSM, wherein the decrypted augmented firmware image includes a second signature that is verifiable with the public key.

2. The non-transitory machine-readable medium of claim 1, wherein the decrypted augmented firmware image or blocks of the decrypted augmented firmware image are stored in volatile memory.

3. The non-transitory machine-readable medium of claim 2, wherein a copy of the firmware package is stored in non-volatile memory.

4. The non-transitory machine-readable medium of claim 3, wherein the firmware package is copied to the volatile memory prior to the requesting verification of the first signature.

5. The non-transitory machine-readable medium of claim 1, wherein the operations further comprise reading a version of firmware stored in the HSM, and wherein the transferring is executed in response to a version of firmware image in the decrypted augmented firmware image being later than the version of the firmware stored in the HSM.

6. The non-transitory machine-readable medium of claim 1, wherein the operations further comprise requesting verification of the second signature of the decrypted augmented firmware image by the HSM, wherein the HSM uses the public key to verify an integrity of the decrypted augmented firmware image, and wherein the transferring is responsive to an indication from the HSM that the second signature is verified.

7. The non-transitory machine-readable medium of claim 1, wherein the operations further comprise adding a bus identifier (ID) to a command to initiate the transferring, and wherein the bus ID matches a read only memory (ROM) firmware ID in the HSM.

8. The non-transitory machine-readable medium of claim 1, wherein the firmware package includes a third signature, the public key is a first public key, and the public-private key pair is a first public-private key pair, and wherein the operations further comprise:
    requesting verification of the third signature of the firmware package by the HSM, wherein the HSM uses a second public key of a second public-private key pair to verify an integrity of the firmware package, and wherein the requesting of the verification of the first signature of the firmware package is executed responsive to an indication from the HSM that the third signature is verified.

9. The non-transitory machine-readable medium of claim 8, wherein the operations further comprise storing the first public key, the symmetric key and the second public key in a secure memory of the HSM.

10. A system comprising:
    a hardware security module (HSM) storing updatable firmware;
    a non-transitory memory having machine-readable instructions; and
    a processor core that accesses the non-transitory memory and executes the machine-readable instructions, the machine-readable instructions comprising a firmware verifier being executable by the processor core to perform operations comprising:
        requesting verification of a first signature of a firmware package for the HSM by the HSM, wherein the HSM uses a public key of a public-private key pair to verify an integrity of the firmware package;
        extracting an encrypted augmented firmware image from the firmware package responsive to an indication from the HSM that the first signature is verified;
        requesting decryption of the encrypted augmented firmware image by the HSM, wherein the HSM uses a symmetric key to provide a decrypted augmented firmware image in response to the request for decryption; and
        transferring the decrypted augmented firmware image to the HSM, wherein the decrypted augmented firmware image is written to an HSM firmware region responsive to the transferring,
    wherein the HSM includes a firmware updater being executable by the HSM to perform operations, the operations for the firmware updater comprising:
        verifying a second signature in the decrypted augmented firmware image to verify an integrity of a firmware image of the decrypted augmented firmware image using the public key.

11. The system of claim 10, wherein the firmware package includes a third signature, the public key is a first public key, the public-private key pair is a first public-private key pair, and the operations for the firmware verifier further comprising:
    requesting verification of the third signature of the firmware package by the HSM, wherein the HSM uses a second public key of a second public-private key pair to verify an integrity of the firmware package, and wherein the requesting of the verification of the first signature of the firmware package is executed responsive to an indication from the HSM that the third signature is verified.

12. The system of claim 11, further comprising an HSM asset store that stores the first public key, the symmetric key and the second public key, wherein the HSM asset store is stored in a secure memory of the HSM.

13. The system of claim 10, wherein the operations for the firmware updater further comprise confirming that a bus identifier (ID) of the transferring matches a read only memory (ROM) firmware ID of the HSM, wherein the verifying of the second signature is responsive to the confirming.

14. The system of claim 10, wherein the decrypted augmented firmware image or blocks of the decrypted augmented firmware image are stored in volatile memory.

15. The system of claim 14, wherein the operations for the firmware updater further comprise providing an indication to the firmware verifier that writing is completed.

16. The system of claim 15, wherein the operations for the firmware verifier further comprise deleting the decrypted augmented firmware image from the non-transitory memory responsive to the indication that the writing is completed.

17. The system of claim 14, wherein the firmware package is stored in the volatile memory.

18. The system of claim 17, wherein a copy of the firmware package is stored in non-volatile memory.

19. The system of claim 18, wherein the firmware verifier is configured to copy the firmware package to the volatile memory prior to the requesting verification of the first signature.

20. The system of claim 10, wherein the operations for the firmware verifier further comprise reading a version of firmware stored in the HSM, and wherein the transferring is executed in response to a version of firmware image in the decrypted augmented firmware image being later than the version of the firmware stored in the HSM.

* * * * *